US012384062B2

(12) United States Patent
Van Dyke

(10) Patent No.: US 12,384,062 B2
(45) Date of Patent: Aug. 12, 2025

(54) LOCKING MECHANISM FOR FOLDING DEVICES

(71) Applicant: Contraption Collection LLC, Albuquerque, NM (US)

(72) Inventor: David C. Van Dyke, Albuquerque, NM (US)

(73) Assignee: CONTRAPTION COLLECTION LLC, Albuquerque, NM (US)

( * ) Notice: Subject to any disclaimer, the term of this patent is extended or adjusted under 35 U.S.C. 154(b) by 296 days.

(21) Appl. No.: 17/956,688

(22) Filed: Sep. 29, 2022

(65) Prior Publication Data

US 2023/0094445 A1 Mar. 30, 2023

Related U.S. Application Data

(60) Provisional application No. 63/249,955, filed on Sep. 29, 2021.

(51) Int. Cl.

*B26B 13/00* (2006.01)
*B26B 1/04* (2006.01)
*B26B 1/10* (2006.01)

(52) U.S. Cl.

CPC .............. *B26B 13/005* (2013.01); *B26B 1/04* (2013.01); *B26B 1/10* (2013.01)

(58) Field of Classification Search

CPC .... B26B 1/10; B26B 1/02; B26B 1/04; B26B 13/005; B26B 13/00; B26B 13/26; B26B 13/28; B26B 11/003; B26B 17/02; B25G 1/06

See application file for complete search history.

(56) References Cited

U.S. PATENT DOCUMENTS

2019/0299388 A1* 10/2019 Blumenthal ............ B26B 13/28

FOREIGN PATENT DOCUMENTS

CN 108237559 A * 7/2018 ............... B26B 1/04
WO WO-2018107399 A1 * 6/2018 ............... B25B 7/00

OTHER PUBLICATIONS

"Baliscissors Ep 1 Transcript", https://www.youtube.com/watch?v=nc_mDt2UIWg, May 20, 2019.
"Baliscissors Ep 11 Transcript", https://www.youtube.com/watch?v=wlivpgYun9E, Jun. 7, 2020.

(Continued)

*Primary Examiner* — Jennifer S Matthews
(74) *Attorney, Agent, or Firm* — Philip D. Askenazy; Peacock Law P.C.

(57) ABSTRACT

Designs and methods of operation for balitools such as balisongs, butterfly knives, and baliscissors. Two cylindrical locking pins that connect the handles and the tool or blade(s) have semicylindrical protuberances that are trapezoidally arranged. This enables both the use of tapered handles and smooth rotation of the handles with respect to the tool or blade(s) while requiring only a single button assembly to switch between different modes such as pocket mode, in which the handles are locked covering the tool or blade(s); bali mode, in which the tool or blade(s) can swing freely relative to the handles (and, for baliscissors, the scissor blades are locked together); and, for baliscissors, scissors mode, in which each scissors blade is locked to one of the handles.

14 Claims, 21 Drawing Sheets

(56) References Cited

OTHER PUBLICATIONS

"Baliscissors Ep 3 Transcript", https://www.youtube.com/watch?v=bZxY32jiq5s, Aug. 8, 2019.
"Baliscissors Ep 7 Transcript", https://www.youtube.com/watch?v=iRPRe-IS1CA, Jan. 2, 2020.
Contraption Collection , "16th ball and spring. Way too hard to get together", https://www.instagram.com/p/CANrmQQjwgD/, May 15, 2020.
Contraption Collection , "More Ideas", https://www.instagram.com/p/B54AzVon1Dz/, Dec. 9, 2019.

* cited by examiner

Section View B

Section View D

Section View F

LOCKING MECHANISM FOR FOLDING DEVICES

CROSS-REFERENCE TO RELATED APPLICATIONS

This application claims priority to and the benefit of the filing of U.S. Provisional Patent Application No. 63/249,955, entitled "Locking Mechanism for Folding Devices", filed on Sep. 29, 2021, the entirety of which is incorporated herein by reference.

BACKGROUND OF THE INVENTION

Field of the Invention (Technical Field)

Embodiments of the present invention relate to a locking mechanism for folding devices, particularly bladed folding devices.

DESCRIPTION OF RELATED ART

Note that the following discussion may refer to a number of publications and references. Discussion of such publications herein is given for more complete background of the scientific principles and is not to be construed as an admission that such publications are prior art for patentability determination purposes.

Butterfly knives, also known as balisongs, are a type of folding pocketknife which feature two rotating handles that can close around a single blade. This free-swinging handle design means a skilled user can perform many tricks to open and close the knife. Users call this "flipping" and competitions even exist to see who can best string together many complex tricks.

Butterfly knives usually have a "safe" edge and a sharp edge. Users must learn when to grab the "safe handle" and when to grab the "bite handle" when performing tricks to ensure the sharp edge of the blade doesn't collide with their fingers. To learn maneuvers safely, "trainer" versions of butterfly knives with no sharp edges are available.

Butterfly knives typically have tapered handles. This means for each handle to travel from the open to closed position, they don't need to travel a full 180 degrees. With a typical balisong, the handles can be closed around the blade, then a latch at the bottom of the handle can be used to secure the handles together, ensuring the blade won't open inside the user's pocket. While useful, many users remove this latch, because it can become a nuisance when performing tricks. The screws that connect a balisong blade with its handles preferably have tight tolerances to allow for easy rotation, but little play, which would cause the blade to collide with the inner sections of the handles.

Devices such as baliscissors allow a user to practice tricks safely like a trainer, but also provide utilitarian use similar to a knife. Because scissors have two, singled edged blades which overlap, there is no chance for a finger to become caught between a handle and a sharp blade. With baliscissors the two handles are free to swing and the two scissor blades are locked together, unable to rotate relative to each other. Pressing a button on the baliscissors unlocks the two blades from each other, with each blade becoming locked to one handle. Magnets inside the blades cause the blades to repel apart. The user cuts with the baliscissors by squeezing the handles. Handles close around the blade and the button is pressed again to lock the scissors and handles together in a closed position, eliminating the need for a latch.

Early baliscissor designs used "locking pins" with round and square cross-sections at specific heights. The position of the pins can be moved up or down with a button. When the square sections of the pin fit within the square sections of the blades or handles, rotation is restricted. When the round sections of the pin are in alignment with the blades or handles, the blades or handles are able to rotate. A cylinder of the correct size will rotate inside of a square hole, but there is limited bearing surface. Wear was concentrated in only four points, and a loose enough fit for rotation meant that the pin was not always supported at all four points, leading to excessive play. Baliscissors preferably have very little play to prevent the blade from hitting the inside surfaces of the handle. Another problem is that the square pin and square hole design requires straight handles as opposed to the tapered handles of a balisong.

Using tapered handles creates a problem, since "double square" shaped holes are created when two square holes overlap. A tapered handle does not need to rotate a full 180 degrees to reach the opposite position. This means that the square pin and hole become misaligned. Adding a second off-angle square to the hole shape allows for the pin to be captured at both angles but causes other problems. The double square configuration poorly supports the round sections of the pin, only allowing contact on four sharp points. The double square design also creates gaps which dramatically decreased contact area resulting in a less firm lock-up. While the double square locking pin designs allow the baliscissors to be locked in "scissor-mode" or "bali-mode," the devices are ineffective as either scissors or balisong stand-ins.

Rotating locking pins have also been used in baliscissor designs allowing the locking pins to rotate with the handles instead of being locked in place with the blades. However, rotating locking pin designs have complex cross-sections and limited functionality.

An issue with double square locking pins is that wear at the corner between the two squares will eliminate the ability for the pin to lock into handles. Triangle and six-pointed star designs were developed to remedy the wear in double square locking pins. Curved transitions were added to the triangle and six-pointed star design to make the design machinable with round tools. The triangle and six-pointed star designs can be functional as scissors, but in "bali-mode" there was too much play. The design still balanced the round pin on points, but with a balance on six points rather the four points in the double square design. What is needed is a baliscissor design that has nearly full contact between the locking pins and the handles despite not rotating a full 180 degrees, while allowing for smooth rotation of the handles with little play.

SUMMARY OF THE INVENTION (DISCLOSURE OF THE INVENTION)

An embodiment of the present invention is a balitool comprising two handles; at least one tool; and two pins for connecting the handles to the at least one tool; wherein a circumference of each pin comprises four first semicylindrical protuberances trapezoidally arranged around the circumference, each said semicylindrical protuberance starting at a first base of the pin and extending parallel to an axis of the pin toward a second base of the pin; and four second semicylindrical protuberances, each second semicylindrical protuberance colinear with one of the first semicylindrical protuberances. The bases of the first semicylindrical protuberances which are not coincident with the first base of each pin, and the bases of the second semicylindrical protuberances, are preferably chamfered. The handles are preferably tapered. Each handle preferably comprises two halves which sandwich the at least one tool. The first handle half preferably comprises the top half of the first handle and a bottom half of a second handle, and the second handle half preferably comprises the bottom half of the first handle and the top half of the second handle. The first handle half and second handle half each preferably comprise an opening for receiving a pin; wherein the opening preferably comprises four lobes corresponding to the four first and second semicylindrical protuberances on each pin; wherein two adjacent lobes are preferably sized to snugly accommodate a semicylindrical protuberance disposed therein; and wherein the other two adjacent lobes are preferably sufficiently large to accommodate approximately 5° of arcuate movement of a semicylindrical protuberance disposed therein. The opening in the first handle half is preferably a mirror image of the opening in the second handle half.

In one embodiment, the balitool comprises a baliscissors, wherein the at least one tool comprises two scissor blades. In this embodiment each pin preferably comprises threaded bosses extending from the first base and the second base. The baliscissors preferably comprises a button assembly, the button assembly preferably comprising a first button half connecting the first base of the first pin and the first base of the second pin, and a second button half connecting the second base of the first pin and the second base of the second pin, wherein the first button half and the second button half are approximately parallel and the first pin and the second pin are approximately parallel to each other and approximately perpendicular to the first button half and the second button half. Each button half preferably comprises two oval openings for accommodating the corresponding threaded boss on the first pin and the corresponding threaded boss on the second pin. Each scissor blade preferably comprises a base portion, the base portion preferably comprising a recess for receiving a magnet, an opening for receiving one of the two pins, and a slot for receiving the other of the two pins. The end of each slot is preferably configured to lock the inserted pin in place. The first semicylindrical protuberances on the first pin are preferably shorter than the first semicylindrical protuberances on the second pin and the second semicylindrical protuberances on the first pin are preferably longer than the second semicylindrical protuberances on the second pin.

In another embodiment the at least one tool comprises a single tool, preferably comprising a knife, a training knife, a bottle opener, a can opener, or a bar key. When the single tool comprises a knife the balitool is preferably a balisong or butterfly knife. The two pins in this embodiment are preferably identical.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate the practice of embodiments of the present invention and, together with the description, serve to explain the principles of the invention. The drawings are only for the purpose of illustrating certain embodiments of the invention and are not to be construed as limiting the invention. In the drawings.

DETAILED DESCRIPTION OF EMBODIMENTS OF THE INVENTION

Figure 1:
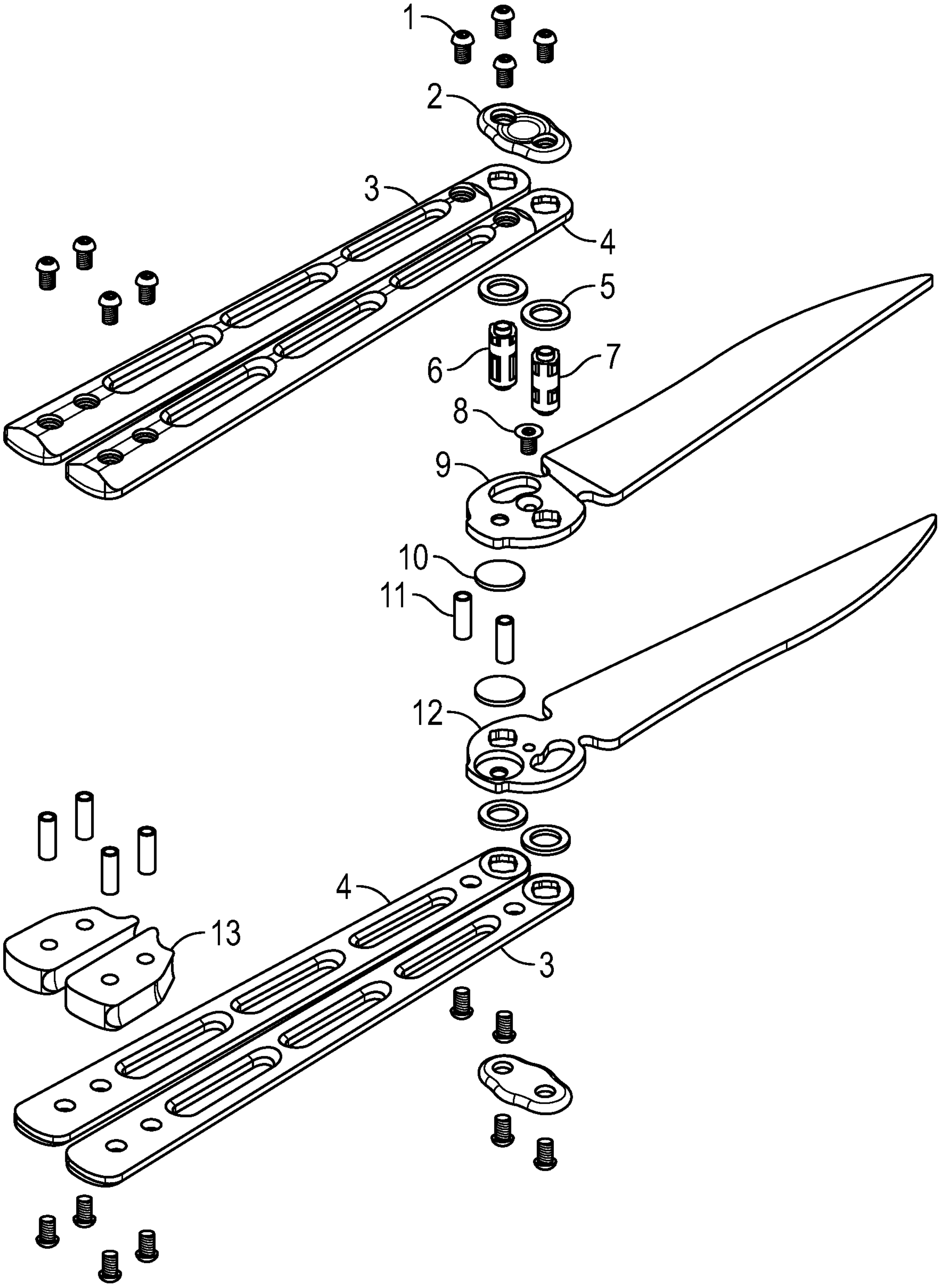
FIG. 1 is an exploded view of an embodiment of a baliscissors of the present invention.
Figure 2:
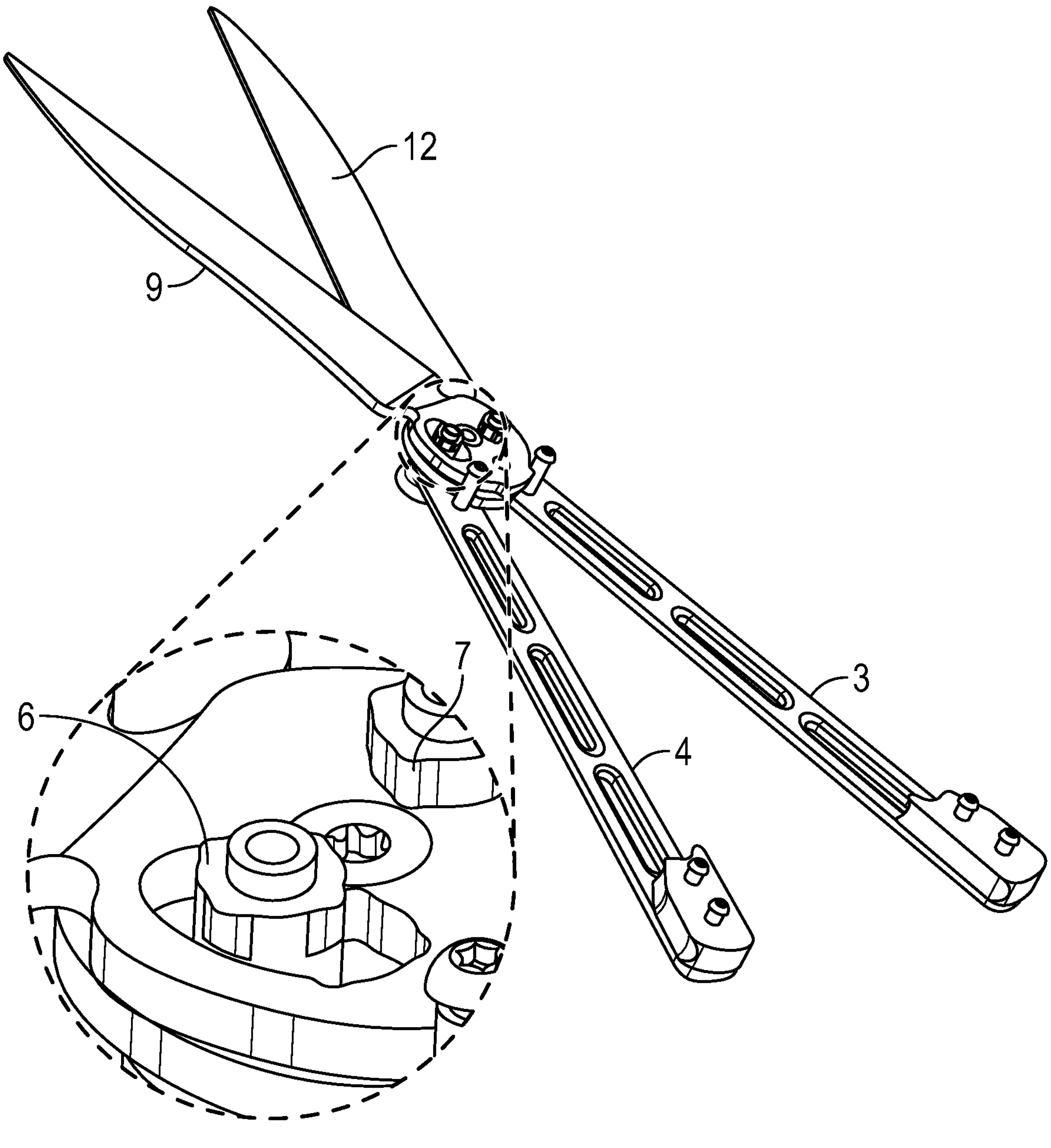
FIG. 2 shows the baliscissor assembled with the top button and two handle halves removed for ease of viewing.

As used throughout the specification and claims, the term "balitool" means balisong, butterfly knife, fan knife, Batangas knife, balisong bottle opener, balisong can opener, balisong bar key, baliscissors, and other folding devices comprising handles that are capable of swinging freely with respect to the blade(s) or other tool(s) of the device, and trainer versions thereof. As used throughout the specification and claims, the term "protuberance" means protrusion, extension, bulge, bump, lobe, protuberance, and the like. In the specification and claims, the term "lobe" is used synonymously with the term protuberance. FIG. 1 is an exploded view of a baliscissors of the present invention, comprising button head screws 1, buttons 2, first handle halves 3, second handle halves 4 (the locking pin hole of which is preferably a mirror image of the locking pin hole of first handle half 3), thrust bearing washers 5 for enabling smooth operation of the device, long-lobed locking pin 6, short-lobed locking pin 7, flat head screw 8, first blade 9, magnet 10, female round standoffs 11, second blade 12, and handle spacers 13. FIG. 2 is a view of the partially assembled baliscissors of FIG. 1, in which top first handle half 3 of the left handle, top second handle half 4 of the right handle, and top button 2 have been omitted for clarity, along with a detail showing the locking pin.

Figure 3:
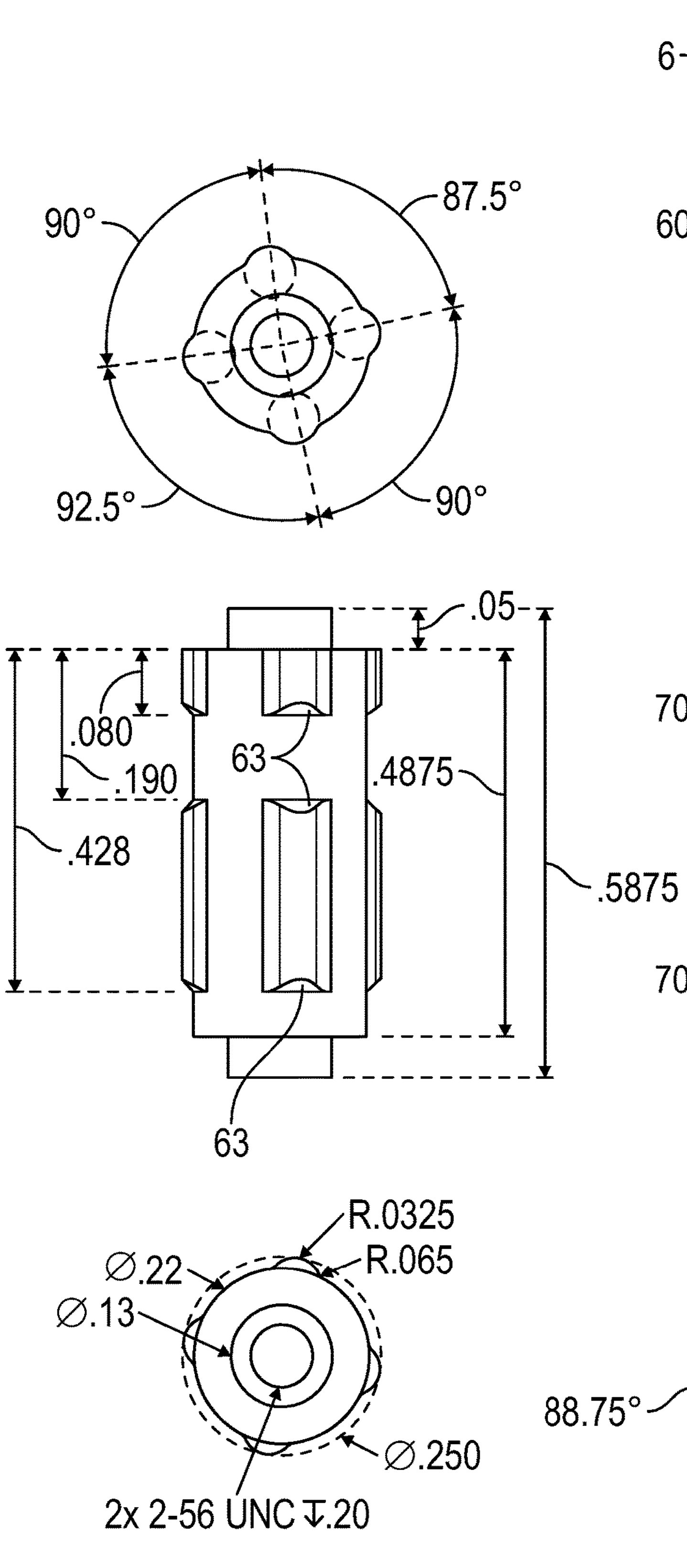
FIG. 3 shows various views of a long-lobed locking pin of the present invention.
Figure 4:
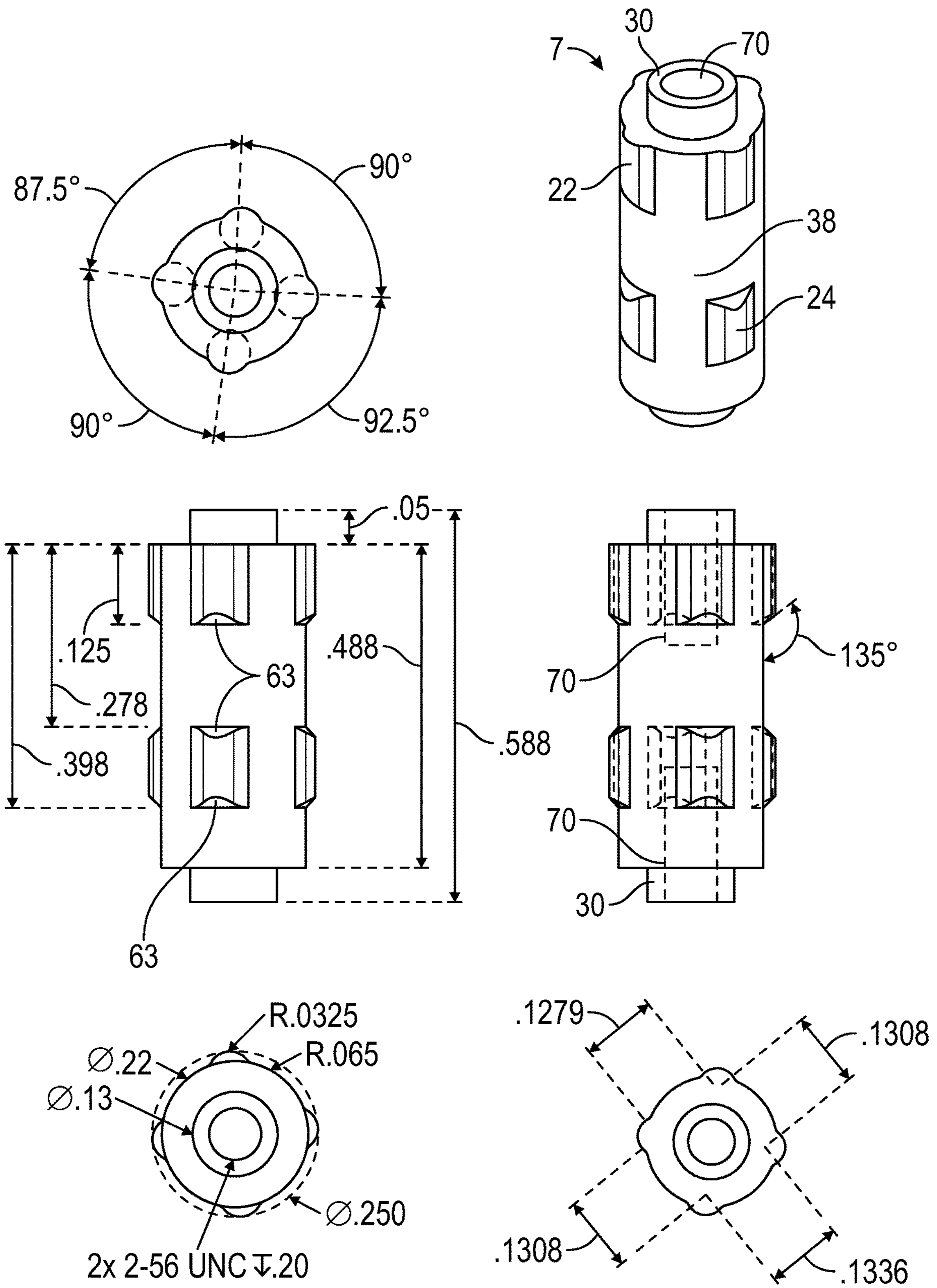
FIG. 4 shows various views of a short-lobed locking pin of the present invention.

FIG. 3 shows various views of long-lobed locking pin 6 used in the button assembly of the baliscissors of the present invention. The four lobes of long-lobed locking pin 6, as viewed from either end of long-lobed locking pin 6, are preferably trapezoidally arranged, as can be seen by the two opposite 90° central angles between two adjacent lobes, the wider side, which encompasses a central angle of 91.25°, and the narrower side, which encompasses a central angle of 88.75°. This is also shown by the lengths 0.1308 in., 0.1279 in., 0.1308 in., and 0.1336 in. of the sides of long-lobed locking pin 6, which are identical to that of short-lobed locking pin 7 as shown in FIG. 4. Long-lobed locking pin 6 preferably comprises threaded cylindrical bosses 30 at each end of body 35, four short lobes 60, and four long lobes 65 disposed on body 35 as shown. Threaded cylindrical bosses 30 comprise a threaded cavities 70 that preferably extend part way into body 35 for receiving screws to hold the buttons in place without binding on the button and preventing button movement, as more fully described below. The lobes preferably enable smooth transitions between button positions; in addition, the lobes preferably each comprise one or more chamfers 63 to aide in alignment through the different blade and handle holes as the button assembly slides up and down as more fully described below.

FIG. 4 shows various views of short-lobed locking pin 7 used in the button assembly of the baliscissors of the present invention. The four lobes of short-lobed locking pin 7, as viewed from either end of short-lobed locking pin 7, are preferably trapezoidally arranged, as can be seen by the two opposite 90° central angles between two adjacent lobes, the wider side, which encompasses a central angle of 91.25°, and the narrower side, which encompasses a central angle of 88.75°. This is also shown by the lengths 0.1308 in., 0.1279 in., 0.1308 in., and 0.1336 in. of the sides of short-lobed locking pin 7. Short-lobed locking pin 7 preferably comprises threaded cylindrical bosses 30 at each end of body 38, four end lobes 22, and four middle lobes 24, which are each approximately the same length as end lobes 22, disposed on body 38 as shown. The lobes preferably enable smooth transitions between button positions; in addition, the lobes preferably each comprise one or more chamfers 63 to aid in alignment through the different blade and handle holes as the button assembly slides up and down as more fully described below. Short-lobed locking pin 7 comprises threaded cavities 70 that preferably extend part way into body 38 for receiving screws to hold the buttons in place without binding on the button and preventing button movement, as more fully described below.

Figure 5A:
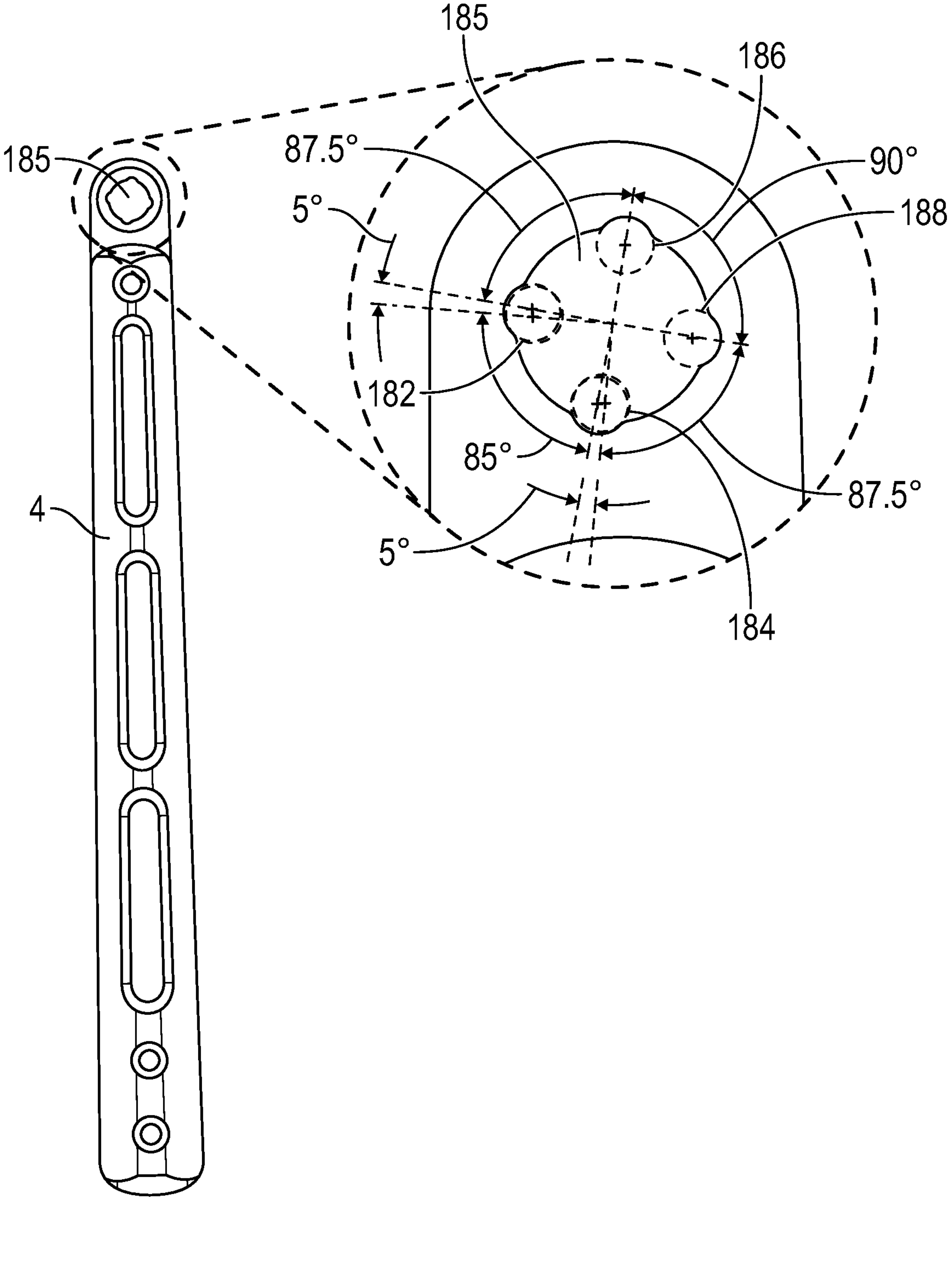
FIG. 5A shows a handle half of the present invention.
Figure 5B:
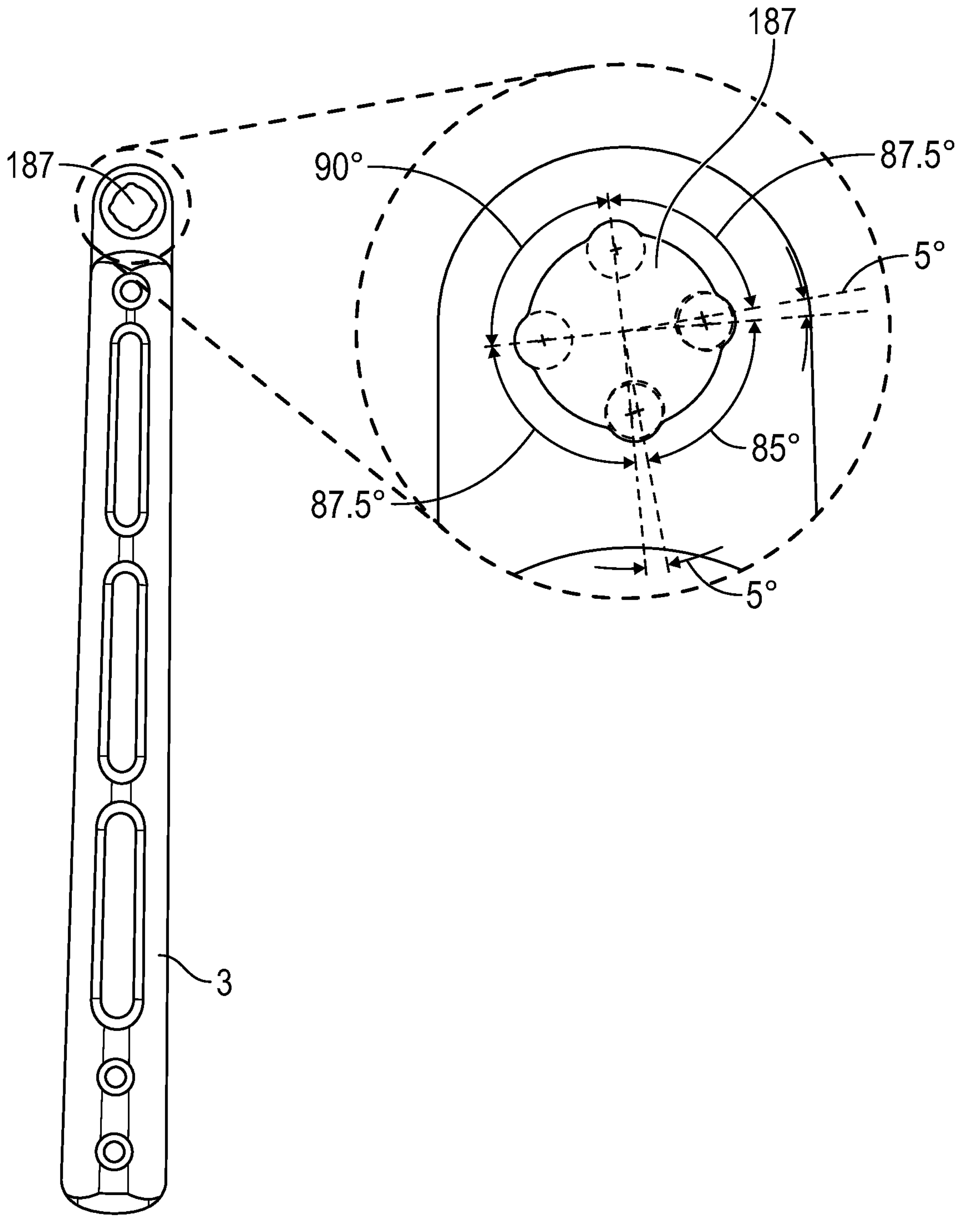
FIG. 5B shows a different handle half of the present invention.
Figure 6B:
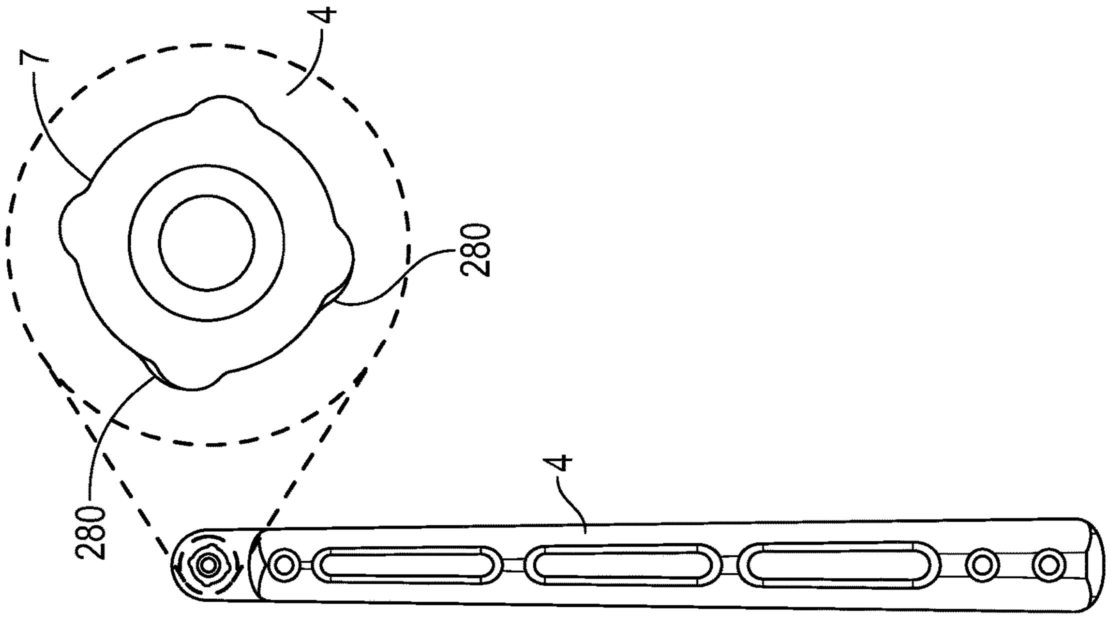
FIGS. 6A and 6B shows gaps formed when a locking pin is in one of the handle halves.
Figure 6A:
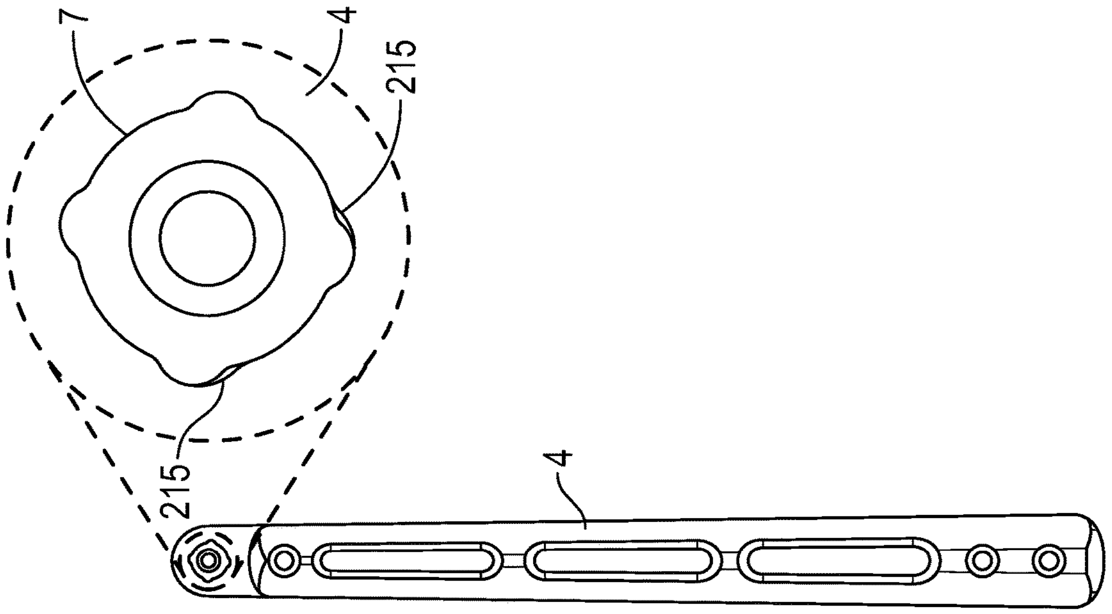

FIG. 5A shows a view of second handle half 4 of a baliscissors of the present invention and a detail of second handle half locking pin hole 185. Second handle half locking pin hole 185 is preferably shaped to receive short-lobed locking pin 7, as shown in FIGS. 6A and 6B. As shown in FIG. 5A, the width of each lobe receptacle 182, 184 is larger than that of lobe receptacles 186, 188. As shown in FIGS. 6A and 6B, this enables two of the end lobes 22 (or two of the middle lobes 24, depending on the button position) to form gaps 215 when second handle half 4 is rotated in a first direction relative to short-lobed locking pin 7 and to form gaps 280 when second handle half 4 is rotated in the opposite direction. FIG. 5B shows a view of first handle half 3 of a baliscissors of the present invention and a detail of second handle half locking pin hole 187, showing that first handle half 3 is configured to be a mirror image of second handle half 4.

Figure 7:
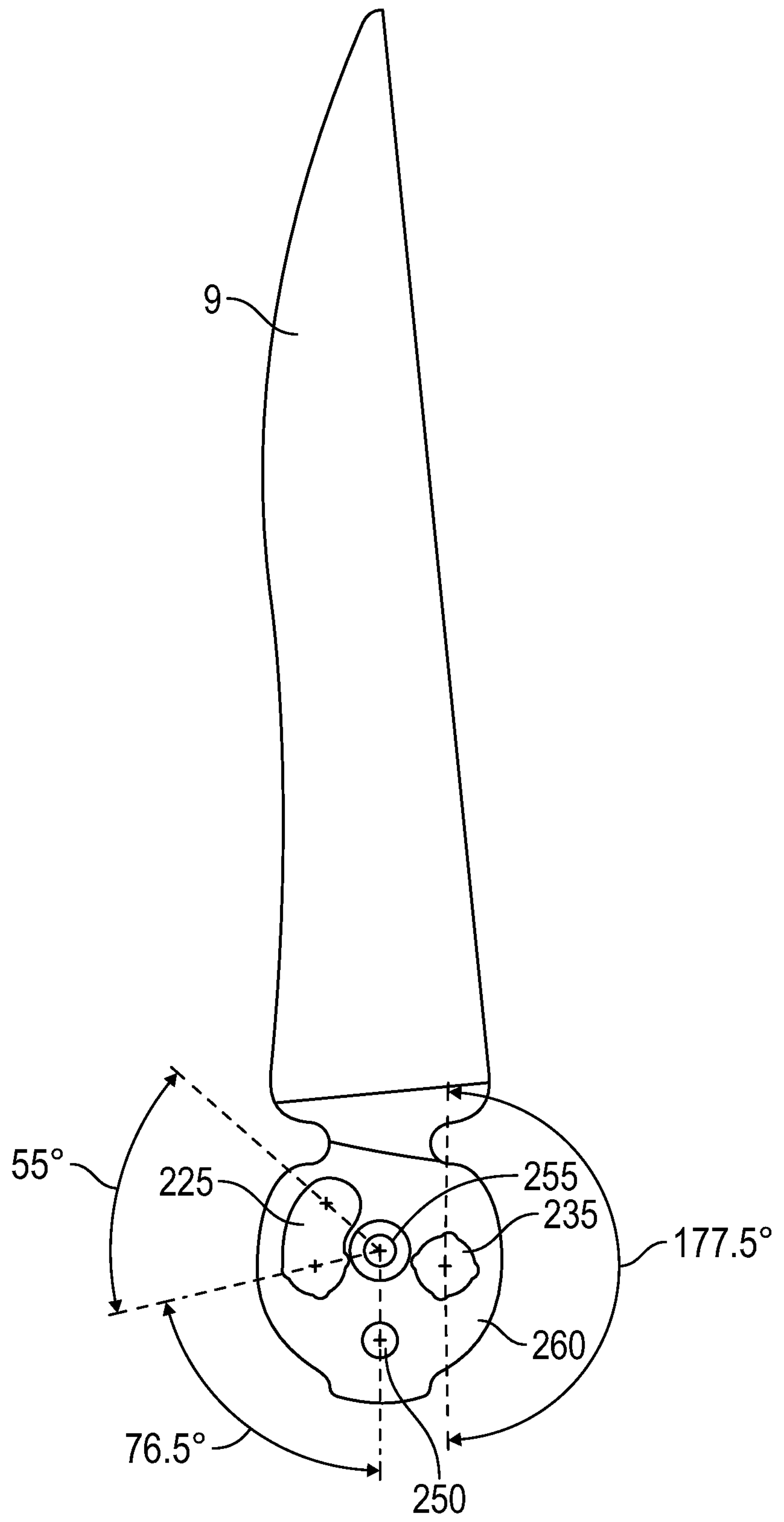
FIG. 7 shows a baliscissors blade of the present invention.

FIG. 7 shows a side view of first blade 9 comprising first blade base 260, which preferably comprises central orifice 255 for receiving flat head screw 8 and magnet release hole 250. First blade base 260 also preferably comprises first blade base locking pin slot 225 and first blade base locking pin hole 235 for receiving long-lobed locking pin 6 and short-lobed locking pin 7, respectively.

Figure 8:
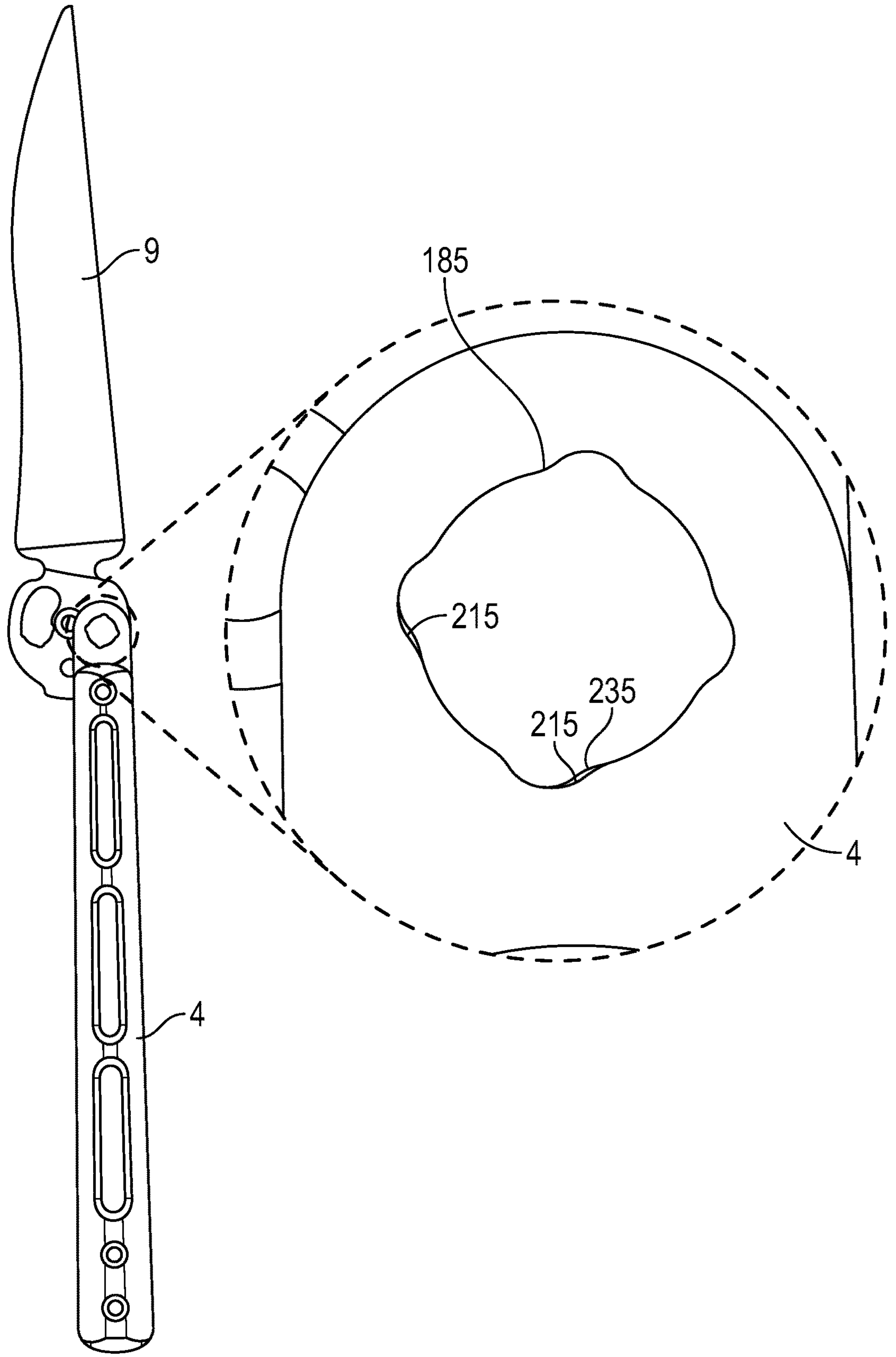
FIG. 8 shows gaps in a first direction formed between the baliscissors blade of FIG. 7 and a handle half.
Figure 9:
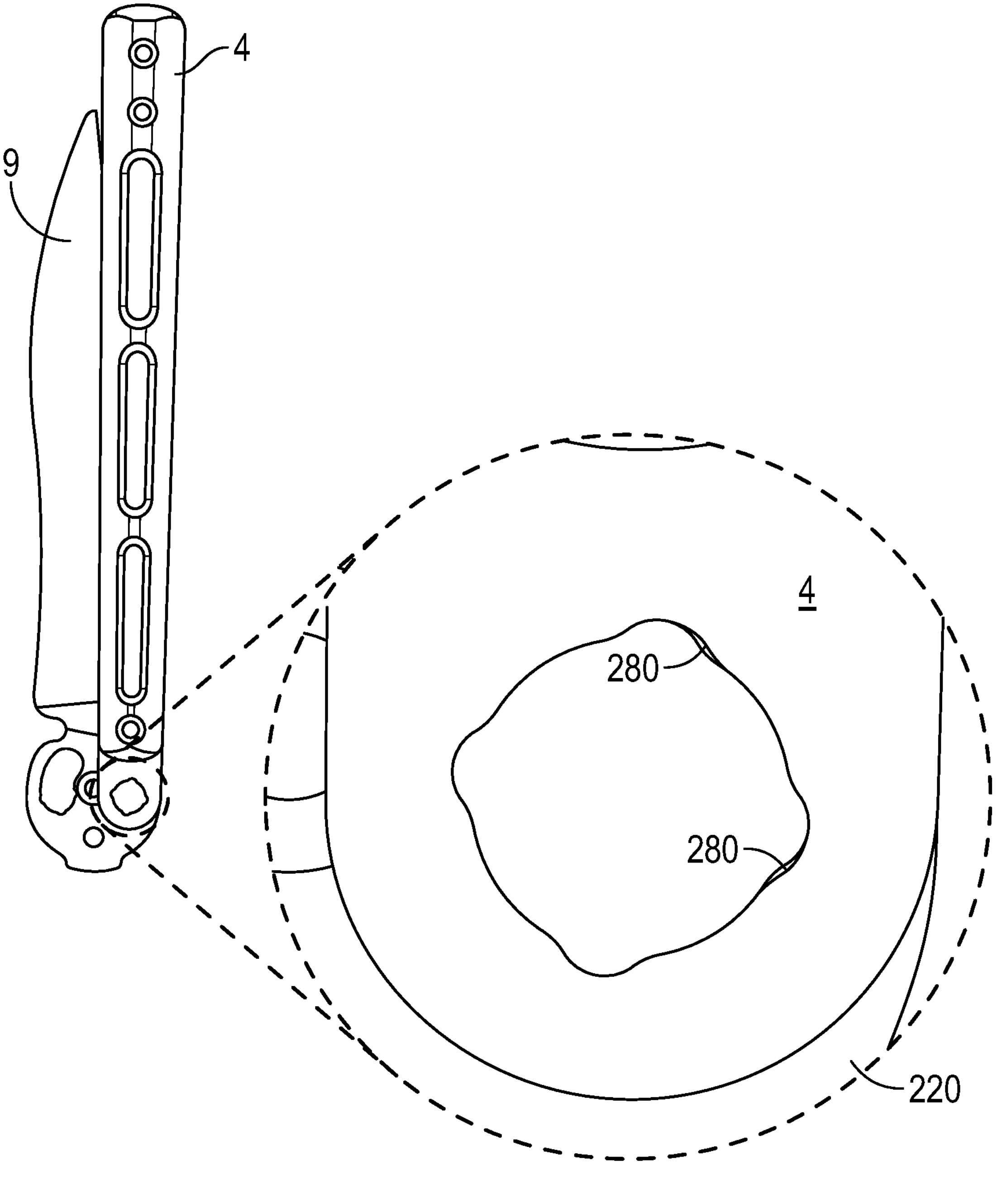
FIG. 9 shows gaps formed in a second direction between the baliscissors blade of FIG. 7 and a handle half.

FIGS. 8 and 9 shows top second handle half 4 aligned with first blade 9 when the baliscissors is in the open position and in the closed or "pocket-mode" position, respectively. As can be seen, while first blade base locking pin hole 235 is preferably sized to exactly fit short-lobed locking pin 7 (not shown), the two enlarged lobe receptacles of second handle half locking pin hole 185 enable gaps 215 and 280 to be formed, as described above. As shown in FIGS. 8 and 9, rotating the handle relative to the blade flips the gaps to the other side of the enlarged lobes, also shown in FIGS. 6A-6B.

Figure 10A:
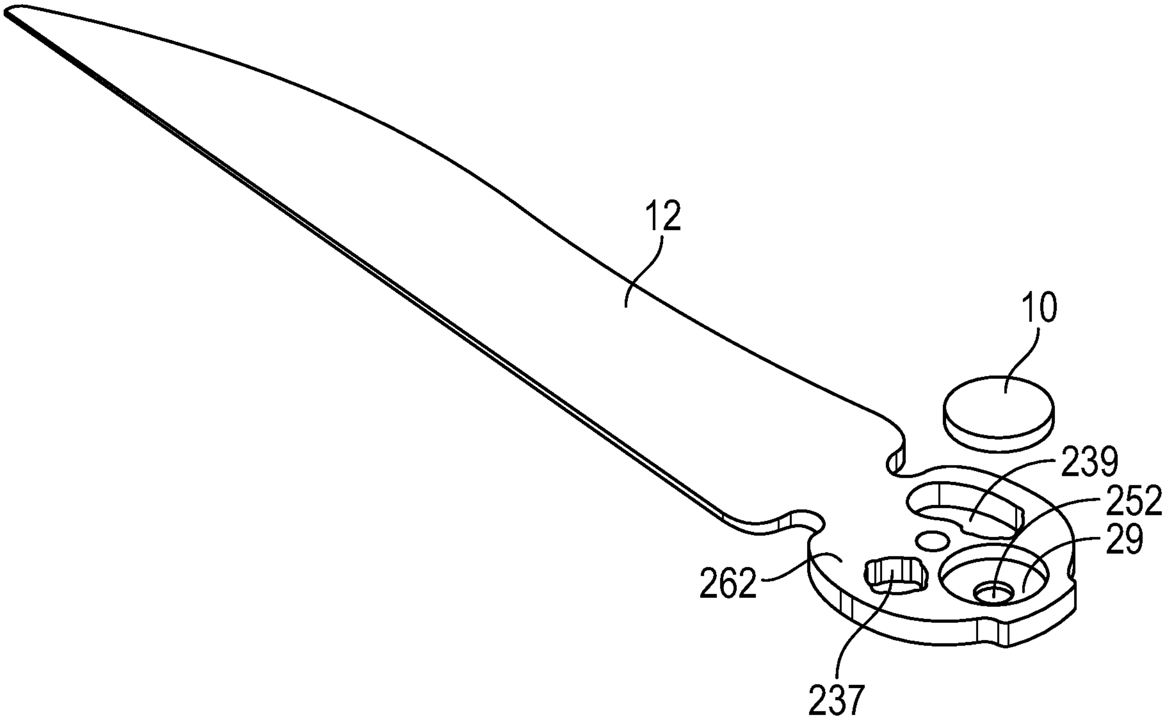
FIGS. 10A and 10B show a magnet being inserted into a baliscissors blade.
Figure 10B:
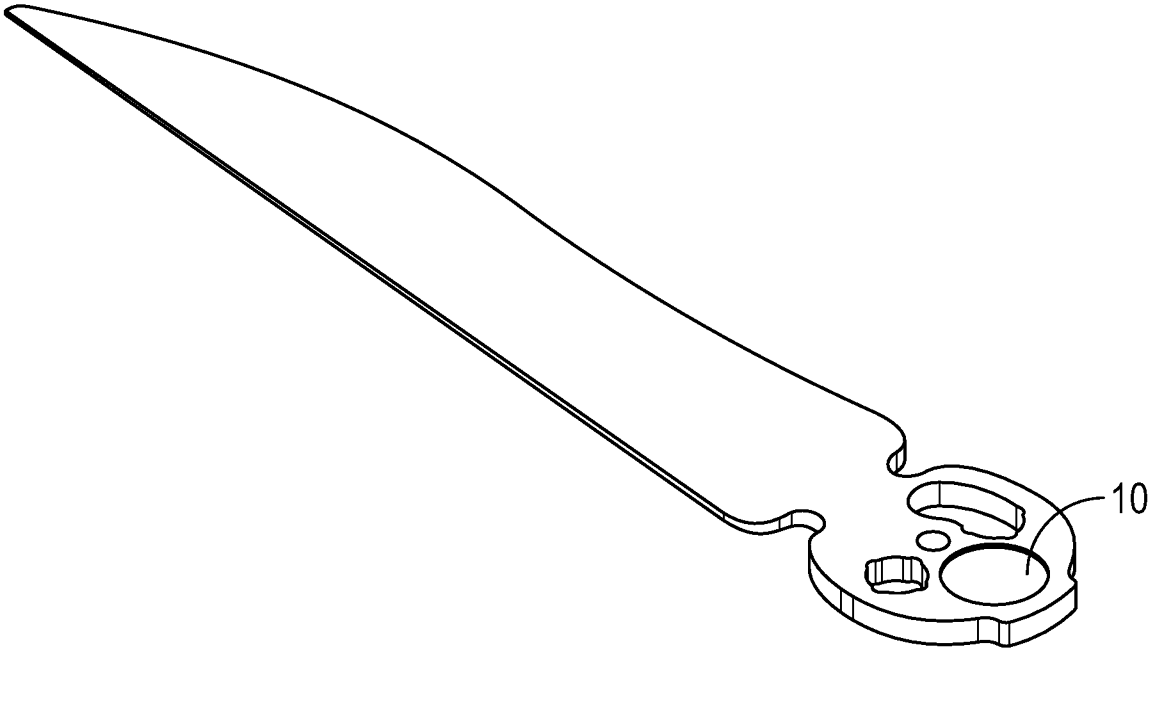
Figure 11:
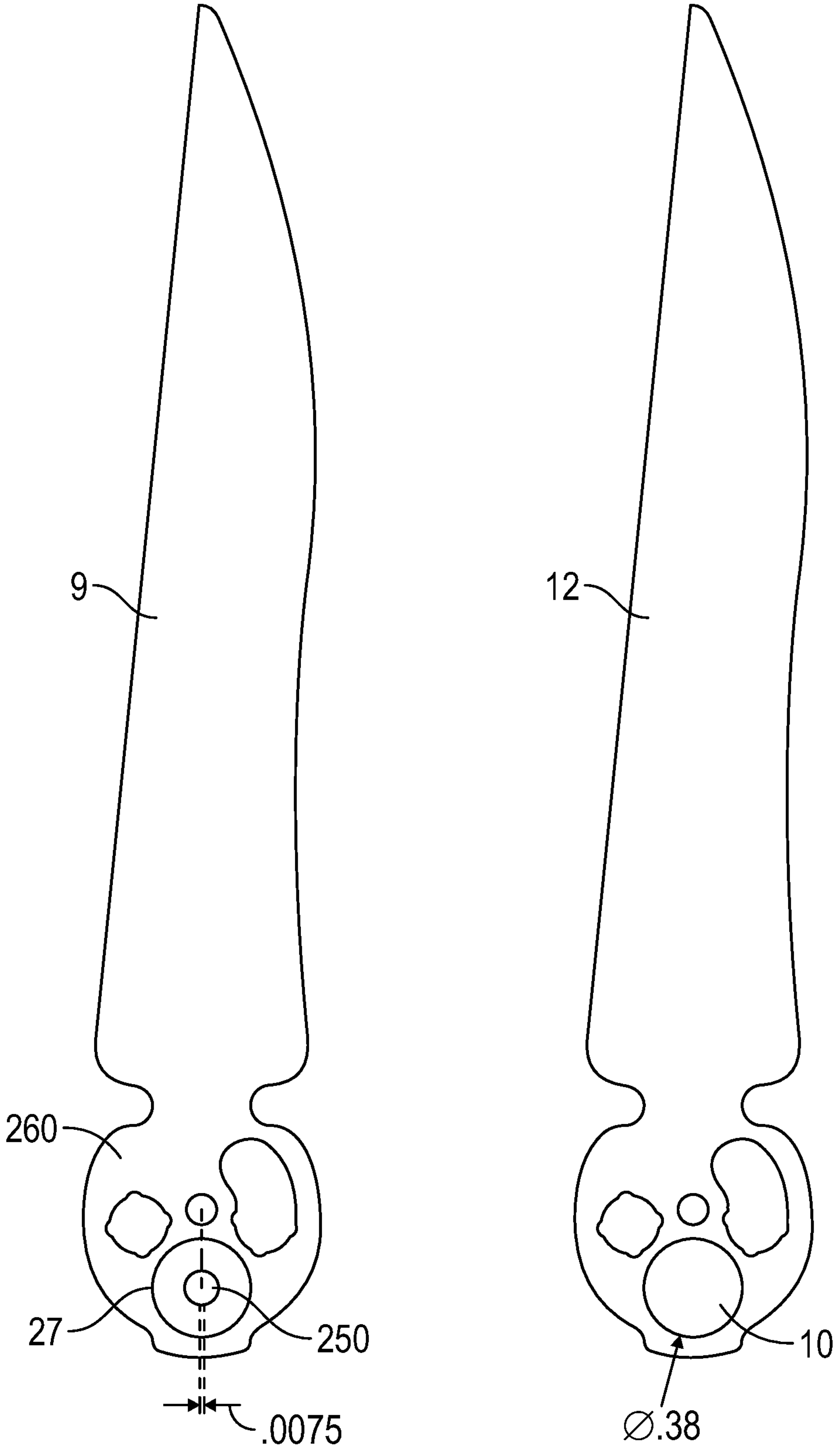
FIG. 11 shows baliscissors blades with and without magnets.

FIGS. 10A, 10B, and 11 show pocket 27 in first blade base 260 and pocket 29 in second blade base 262, each pocket configured to receive a magnet 10. Magnets 10 may be kept in place at least partially by attraction to the blades, if the blades are magnetic; however, the configuration of the assembled baliscissors also keeps the magnets in place. First blade base 260 comprises magnet release hole 250 and second blade base 262 comprises magnet release hole 252 to aid in removing the magnet from pocket if necessary by pushing the magnet out of the pocket from the opposite side of the blade. The magnets are preferably oriented so that when the two blades are assembled together the magnets repel each other, causing the scissors to open for cutting. Pockets 27 and 29 are preferably positioned off center, as shown in FIG. 11, so that the magnets can never completely cross over each other, in which case the magnetic repulsion would force the scissors to close rather than open.

Figure 12:
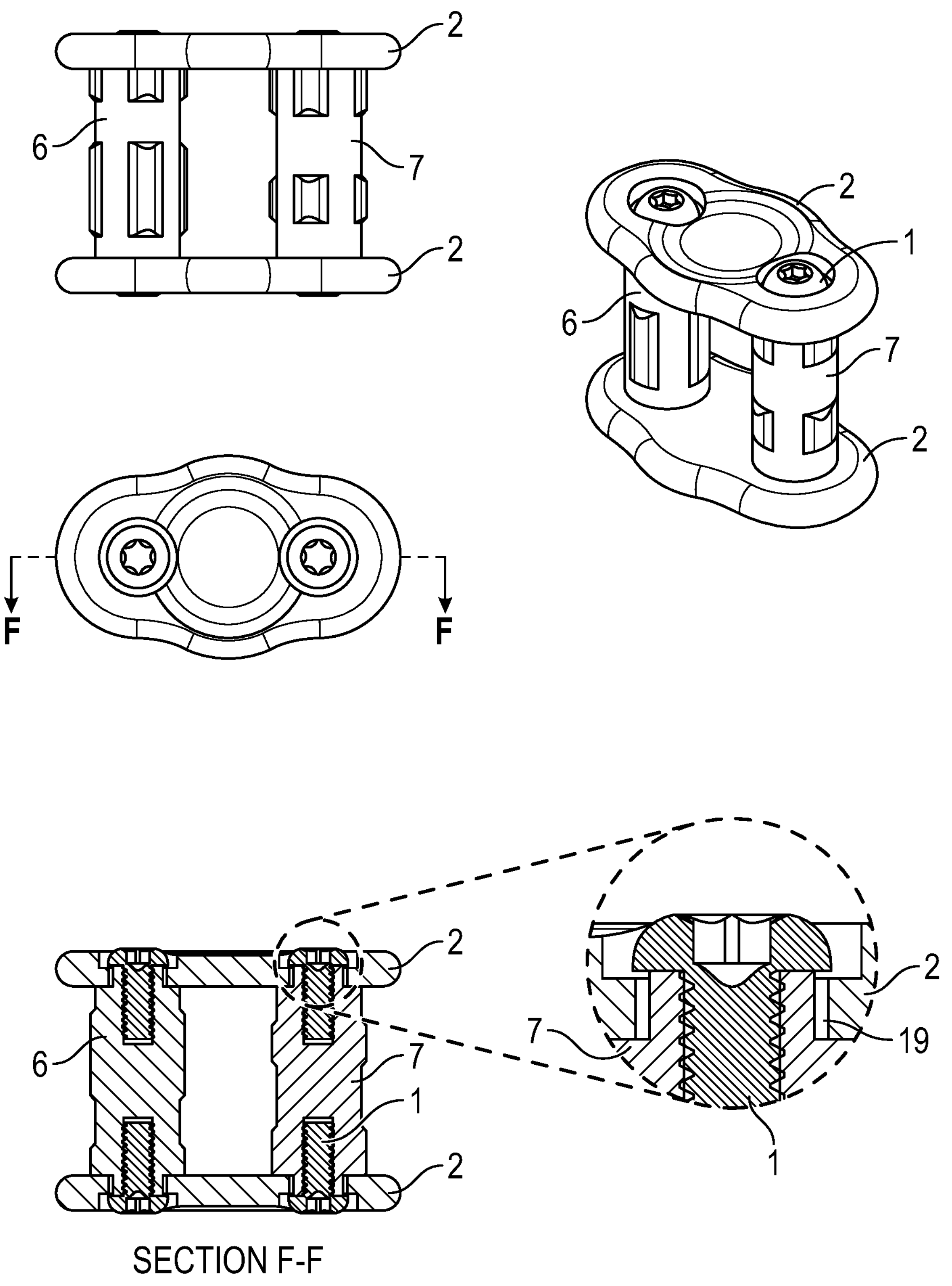
FIG. 12 shows various views of a baliscissors button assembly of the present invention.

FIG. 12 shows various views of an embodiment of the button assembly for the baliscissors embodiment of the present invention. The differences in the lobes between long-lobed locking pin 6 and short-lobed locking pin 7 enable there to be only one button assembly, which moves the locking pins simultaneously through the various locking pin holes.

Figure 13:
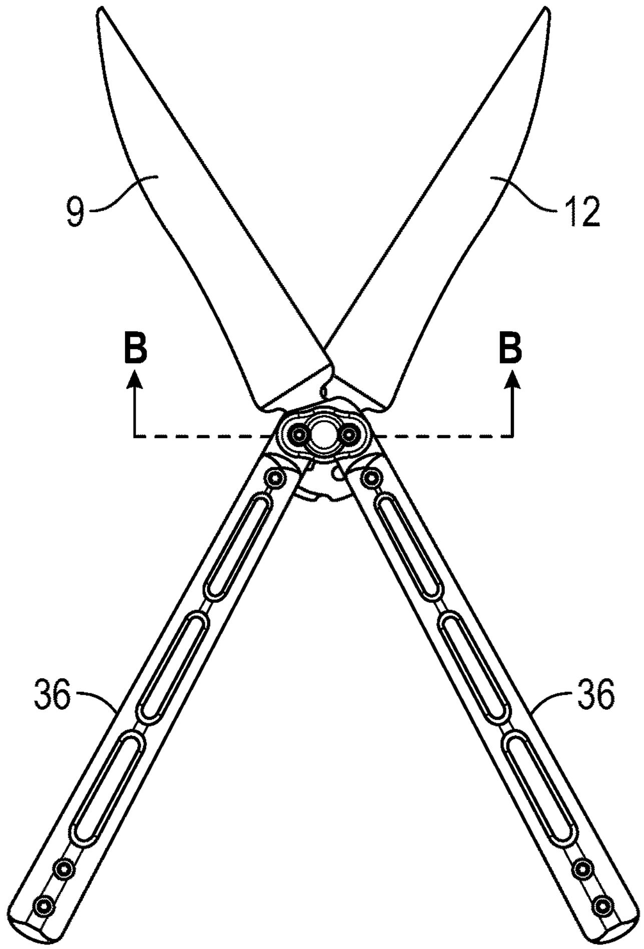
FIG. 13 shows a baliscissors in scissors mode.
Figure 13:
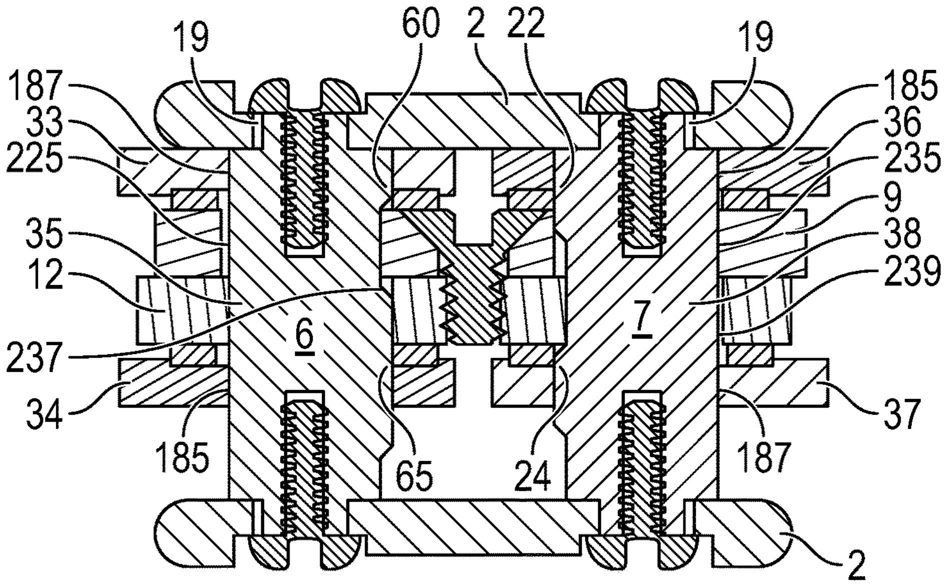

The baliscissors can operate in three modes. In scissors mode, shown in FIG. 13, one of the handles is locked to one of the blades, and the other handle is locked to the other blade, thereby enabling the tool to function as a typical scissors. The amount the baliscissors can open in scissors mode is determined by the length of locking pin slots 225, 239. Referring to FIG. 13, the left handle comprises left first handle half 33 and left second handle half 34, and is locked to second blade 12 because the top of each long lobe 65 of long-lobed locking pin 6 is engaged in second blade base locking pin hole 237, the bottom of each long lobe 65 is engaged in second handle half locking pin hole 185, and each short lobe 60 of long-lobed locking pin 6 is engaged in first handle half locking pin hole 187. Body 35 of long-lobed locking pin 6 rides freely in first blade base locking pin slot 225. Similarly, the right handle comprises right first handle half 37 and right second handle half 36, and is locked to first blade 9 because the bottom of each end lobe 22 of short-lobed locking pin 7 is engaged in first blade base locking pin hole 235, the top of each end lobe 22 is engaged in second handle half locking pin hole 185, and each middle lobe 24 of short-lobed locking pin 7 is engaged in first handle half locking pin hole 187. Body 38 of short-lobed locking pin 7 rides freely in second blade base locking pin slot 239.

FIG. 2 shows a detail of long-lobed locking pin 6 riding in first blade base locking pin slot 225 in scissors mode, with the blades open to their midway position. As can be seen, due to the crescent-like shape of the slot, at this midway position, long-lobed locking pin 6 will be further apart from short-lobed locking pin 7 than it would be when the scissors are in the closed position or in the fully open position. Thus it is preferable that each button comprises oval slot 19, shown in FIGS. 12 and 13, to enable the pins to move apart and closer together in this mode. As shown in FIG. 13, the gaps in oval slots 19 are to the outside of the bosses on the pins, since this figure shows the scissors in the fully open position. In the midway position (not shown in cross section), the gaps in oval slots 19 would be to the inside of the bosses since the pins would be further apart.

The relative orientation of the pins is preferably chosen so the user cannot engage the button when the scissors blades are partially or fully open in scissors mode; thus the blades have to be closed to enable the button to be pushed.

Figure 14:
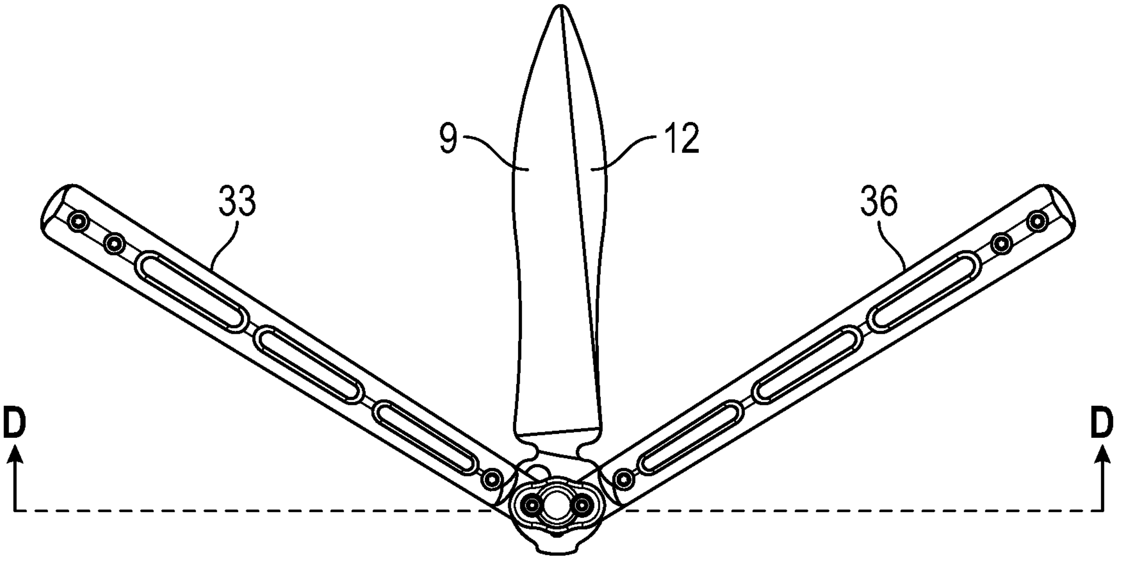
FIG. 14 shows the baliscissors of FIG. 13 in bali mode.
Figure 14:
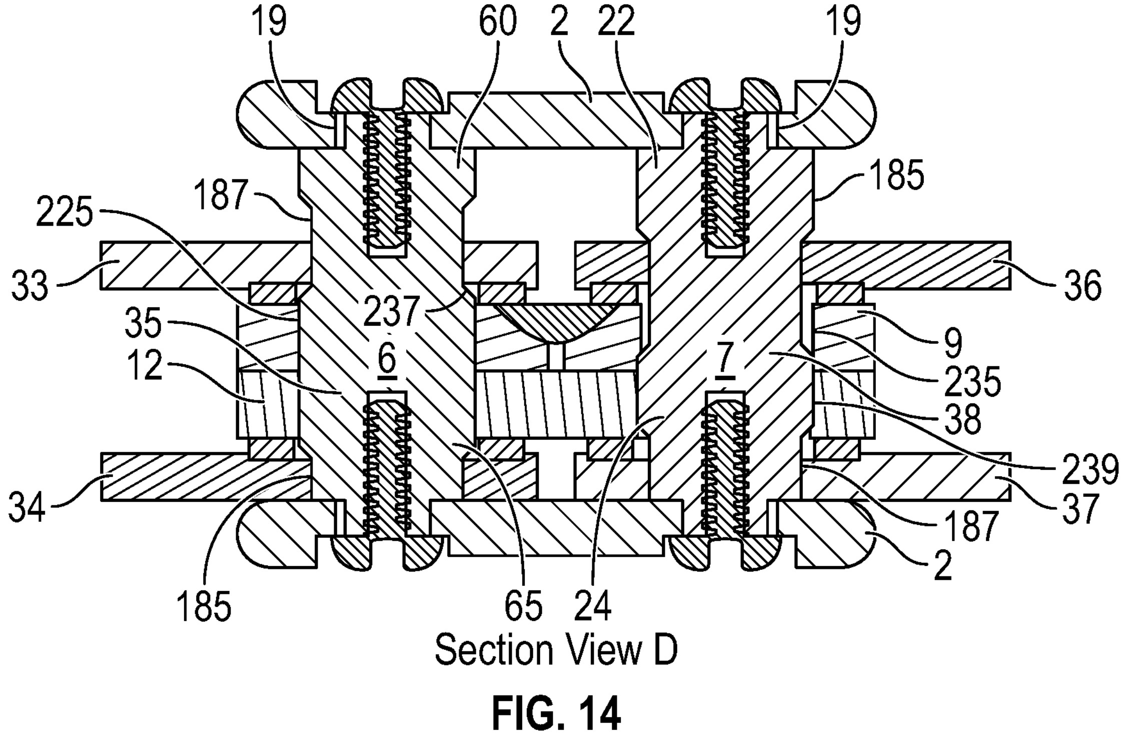

The second mode is bali mode, shown in FIG. 14, in which the blades are locked together but the handles can swing freely. In this mode the handles swing freely around body 35 of long-lobed locking pin 6 and body 38 of short-lobed locking pin 7. Each long lobe 65 of long-lobed locking pin 6 is engaged in both second blade base locking pin hole 237 and the lobed portion at the bottom of first blade base locking pin slot 225, thereby locking the blades together. Similarly, each middle lobe 24 of short-lobed locking pin 7 is engaged in both first blade base locking pin hole 235 and the lobed portion at the bottom of second blade base locking pin slot 239, also locking the blades together.

Figure 15:
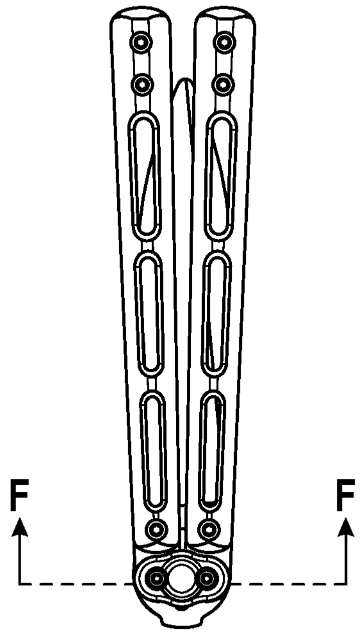
FIG. 15 shows the baliscissors of FIG. 13 in pocket mode.
Figure 15:
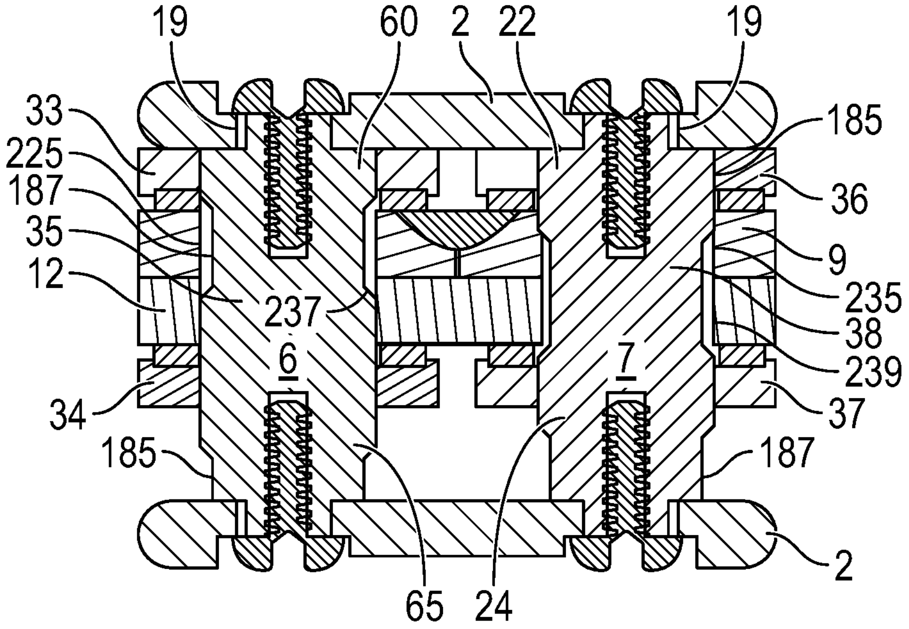

The third mode is pocket mode, shown in FIG. 15, in which the handles are placed around the blades in bali mode before the lock is engaged. Pocket mode has the same locking scheme as scissors mode, but in pocket mode the handles cannot spread apart because the pins that each handle is locked to is at the start of the crescent slot in the blade locked to the opposite handle. The handles also cannot move further together because female round standoffs 11 butt up against the nook in the blade that is fixed to the opposite handle. Thus, in this mode the handles and blades are effectively locked in place until the button is pushed to place the baliscissors into bali mode.

Figure 16:
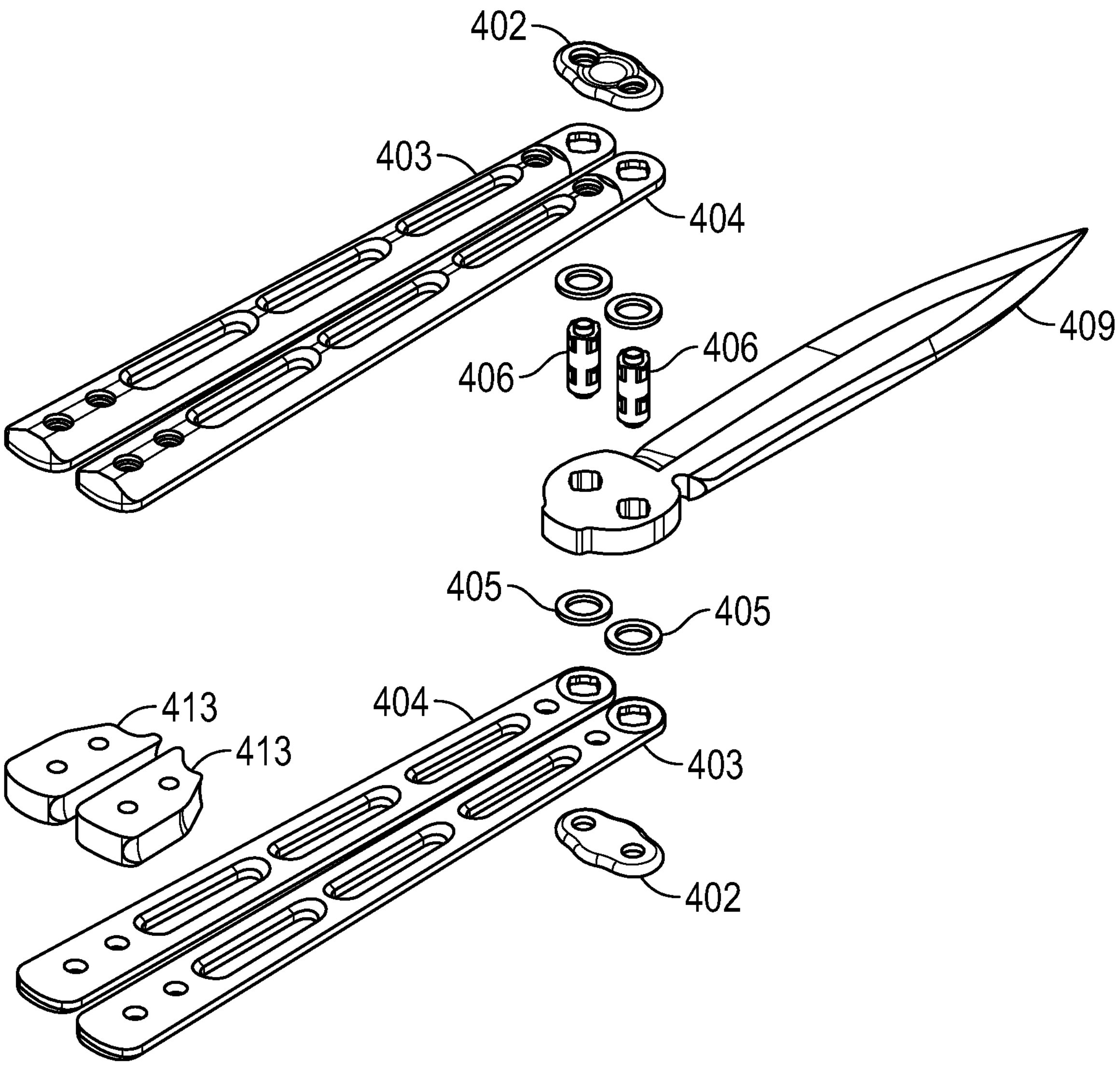
FIG. 16 shows an exploded view of an embodiment of a butterfly knife of the present invention.
Figure 17:
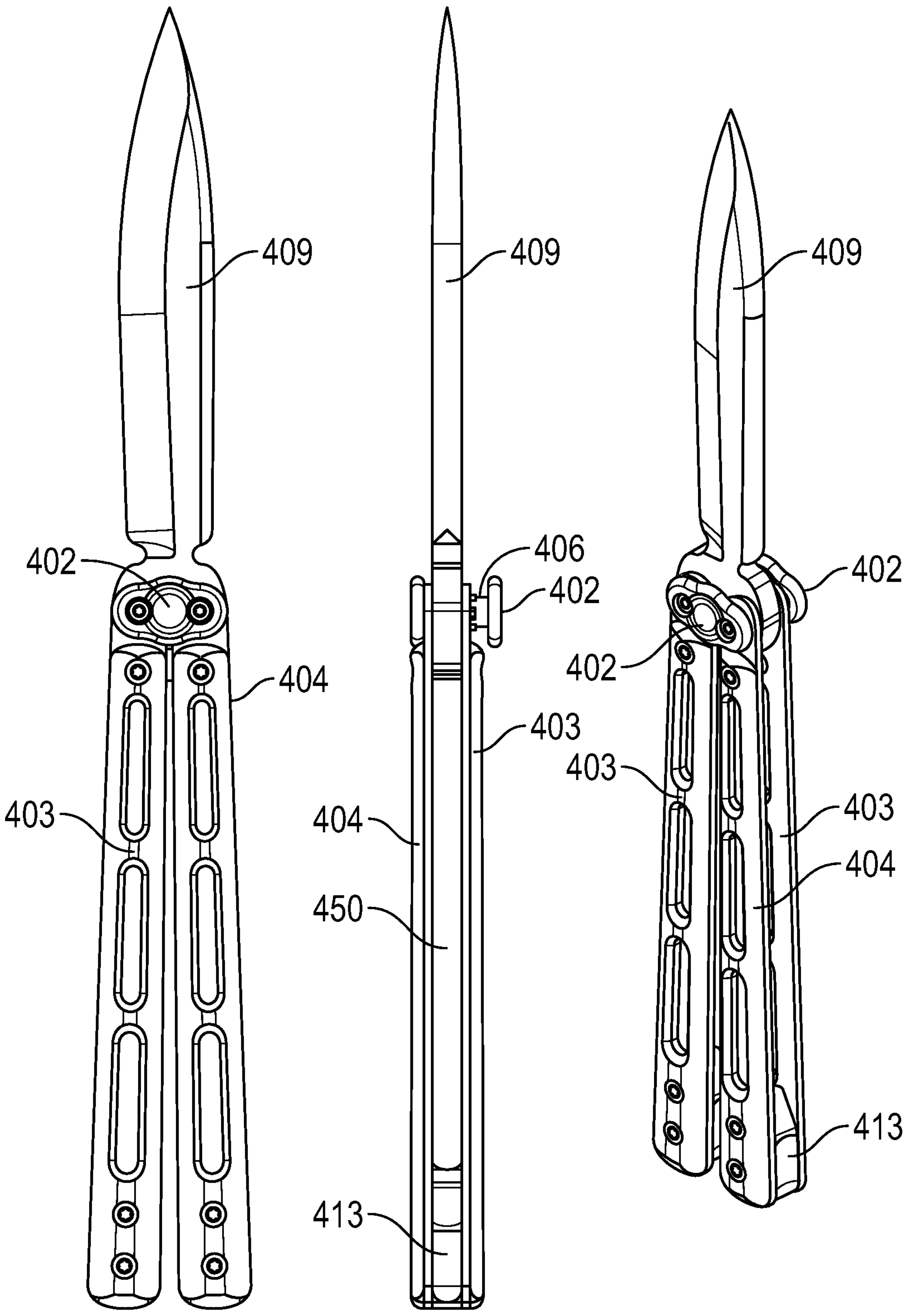
FIG. 17 shows front, side, and perspective views of the butterfly knife of FIG. 16.

FIG. 16 shows an exploded view of an embodiment of a butterfly knife of the present invention, which comprises knife buttons 402, first knife handle halves 403, second knife handle halves 404, thrust bearing washers 405 for enabling smooth operation of the device, locking pins 406, blade 409, and handle spacers 413. Not shown in the figure are female round standoffs and button head screws, which are shown in FIG. 1. FIG. 17 shows front, side, and perspective views of the assembled butterfly knife. Knife buttons 402 are preferably the same as buttons 2, thrust bearing washers 405 are preferably the same as thrust bearing washers 5, handle spacers 413 are preferably the same as handle spacers 13, first knife handle halves 403 are preferably the same as first handle halves 3, and second knife handle halves 404 are preferably the same as second knife handle halves 4. Because there is no scissors mode for this embodiment, there is no need for locking pin slots for the pins to move in as described above, so knife buttons 402 can comprise holes that can snugly accommodate bosses 430, instead of slots 19 used in the baliscissor embodiment. For the same reason, bosses 430 are optional as well for this embodiment.

Figure 18:
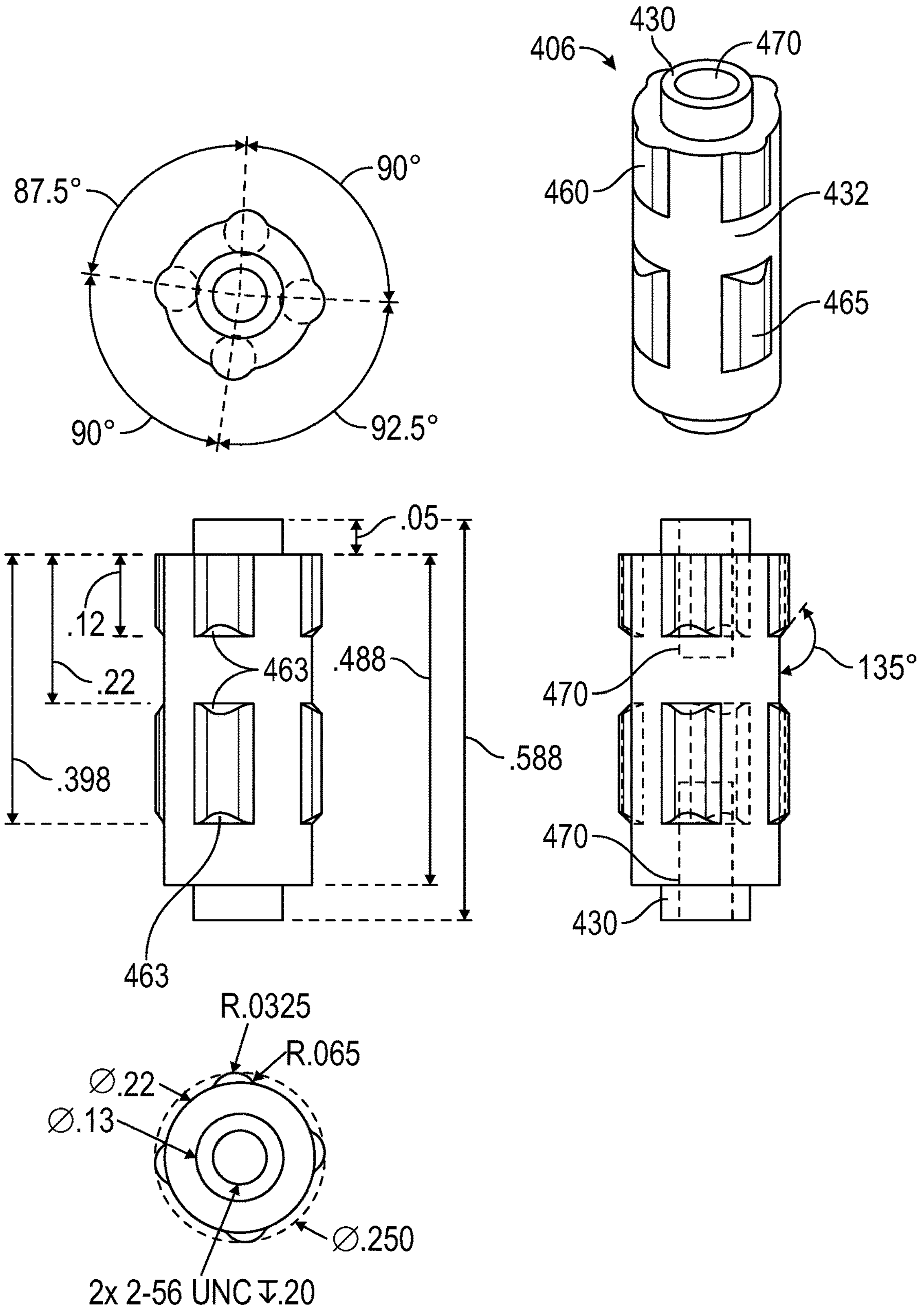
FIG. 18 shows various views of a butterfly knife locking pin of the present invention.

Unlike the baliscissors embodiment, the two locking pins 406 used in the present embodiment are preferably identical to each other. The two locking pin holes in blade 409 are also identical, but their orientations are rotated relative to each other. Because they have the same cross section as the pins used in the baliscissors embodiment, the gaps shown in FIGS. 6, 8, and 9 still occur for this embodiment. As shown in FIG. 18, each locking pin 406 preferably comprises optional threaded cylindrical bosses 430 at each end of body 432, four short lobes 460, and four long lobes 465 disposed on body 432 as shown. The lobes preferably enable smooth transitions between button positions; in addition, the lobes preferably each comprise one or more chamfers 463 to aide in alignment through the different blade and handle holes as the button assembly slides up and down as more fully described below. Each locking pin 406 preferably comprises threaded cavities 470 that extend part way into body 432 for receiving screws to hold the buttons in place without binding on the button and preventing button movement.

Figure 19A:
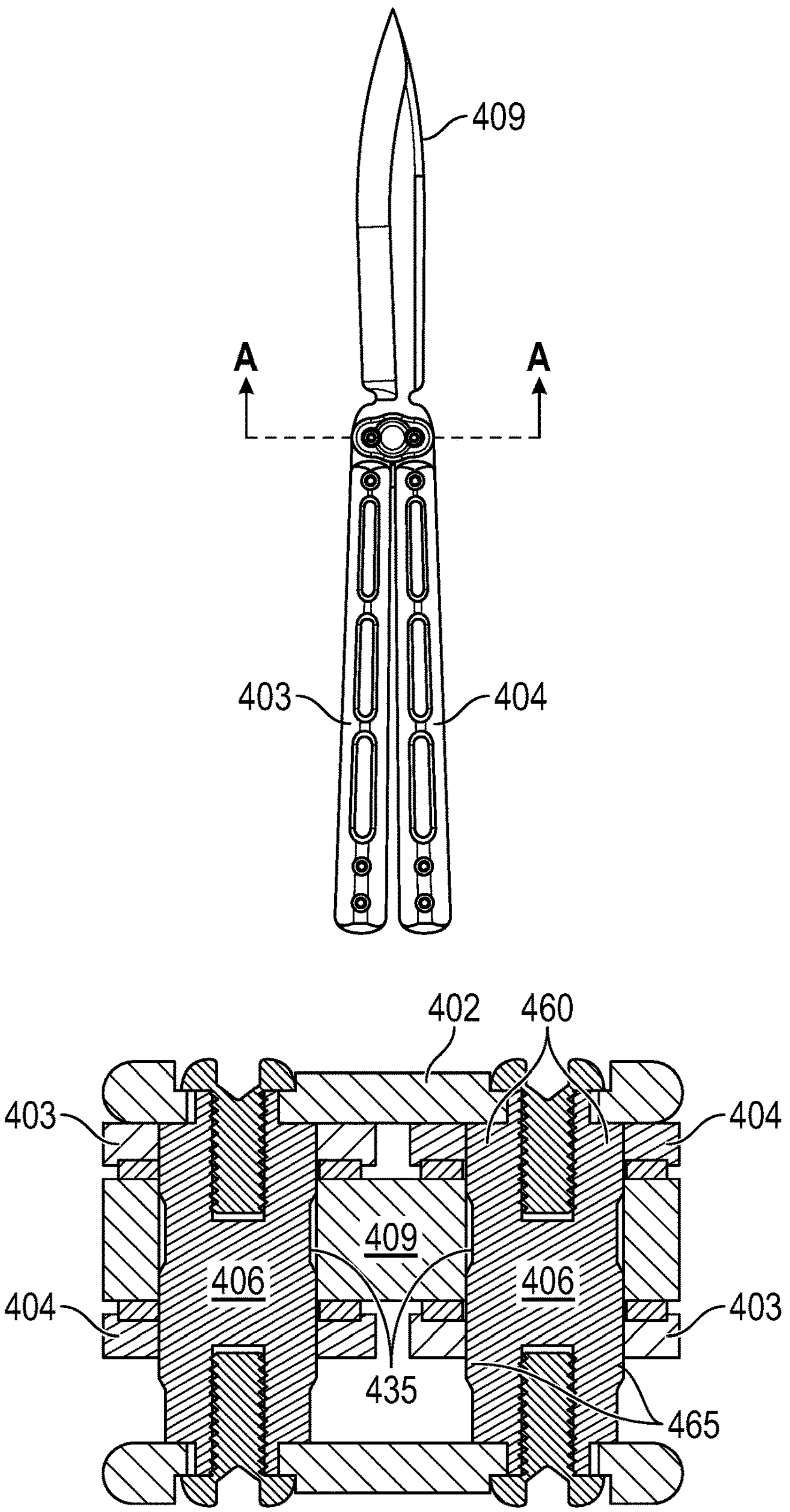
FIG. 19A shows the butterfly knife of FIG. 16 in a mode where the handles are locked to the blade.

FIG. 19A shows the mode in which the handles are locked to blade 409. When the appropriate button (in this view, top button 402) is pressed to engage this mode, the top of each short lobe 460 is engaged in either first handle half locking pin hole 487 or second handle half locking pin hole 485, and the bottom of each short lobe 460 is engaged in one of the blade locking pin holes 435. Similarly, the top of each long lobe 465 is engaged in one of the blade locking pin holes 435, and the bottom of each long lobe 465 is engaged in either first handle half locking pin hole 487 or second handle half locking pin hole 485. Because the shape of each locking pin 406 fits exactly in the blade locking pin holes 435 and the handle locking pin holes, such engagement locks the blade and handles together. In the configuration shown in FIG. 19A, the butterfly knife functions as a typical knife.

Figure 19B:
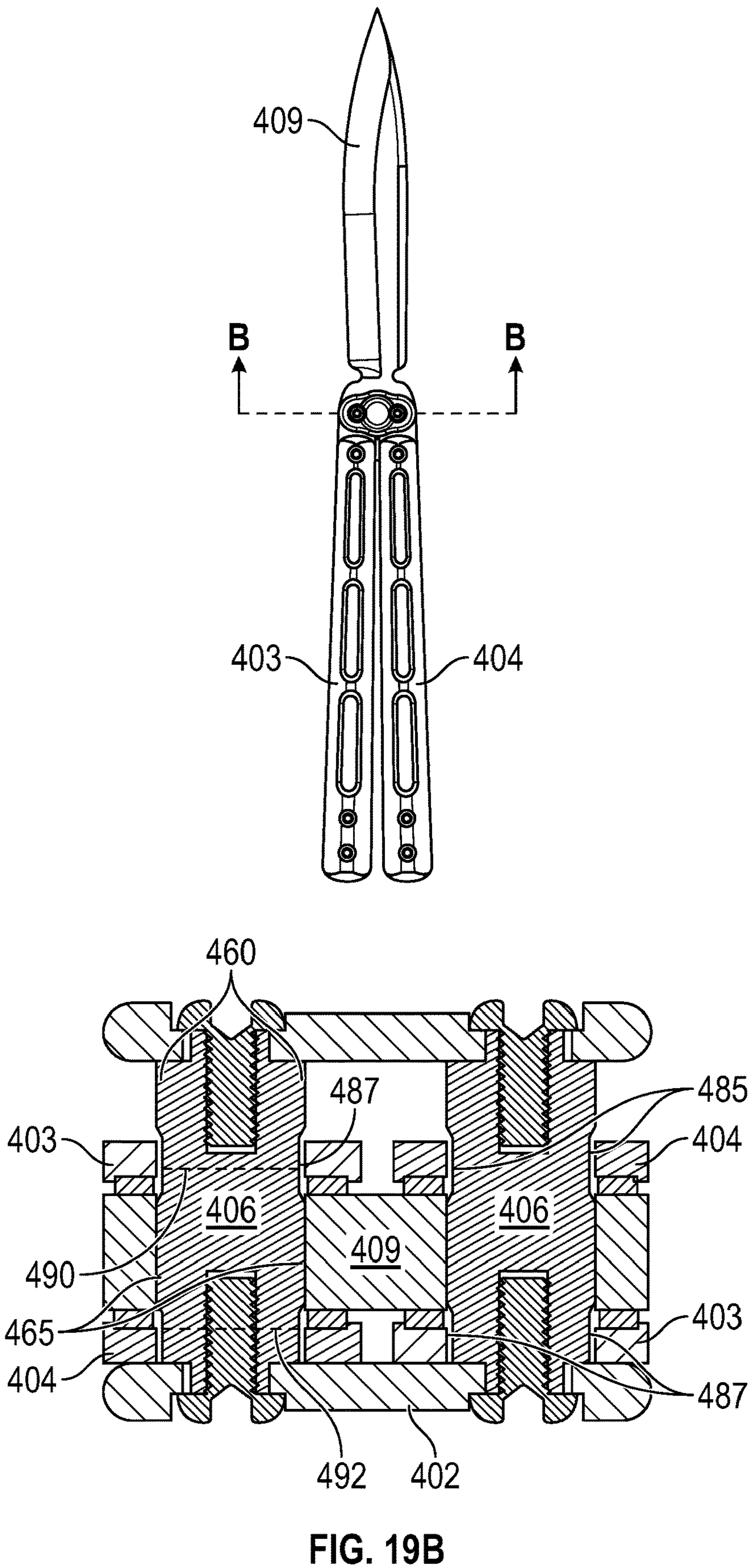
FIG. 19B shows the butterfly knife of FIG. 16 in a mode where the handles can freely rotate.

FIG. 19B shows the mode in which the handles can freely rotate. When the appropriate button (in this view, bottom button 402) is pressed to engage this mode, each short lobe is completely free of engagement with any locking pin hole, and each long lobe is engaged solely within one of the blade locking pin holes 435. Each handle is therefore not engaged by any of the lobes on the locking pins and is thus free to rotate in any direction around a nonlobed circumference 490, 492 of body 432.

When the handles are in the freely rotating configuration shown in FIG. 19B, the handles can be rotated to either side of blade 409 such that blade 409 is disposed in slot 450 formed by handle spacers 413, as shown in FIG. 17. The handles can then be locked into place by moving the button into the position shown in FIG. 19A so the butterfly knife can be carried without exposing blade 409 (similar to the baliscissors configuration shown in FIG. 15).

Each locking pin preferably comprises eight lobes, which are preferably trapezoidally arranged in four columns of two lobes each, with the specific circumferential spacing of the lobes at least partially determined by the tapering angles of the handles. Because of the tapered shape of the handles of embodiments of the present invention, they can only rotate to two positions, closed and fully open, which are 177.5 degrees apart. Note that other embodiments can employ different handle tapers. Without lobes, if the locking pin cross section were square, triangular, or had another polygonal shape, the hole will have a number of gaps (similar to those shown in FIGS. 6A and 6B) equal to the number of sides of the shape. Thus, a square will have four gaps, and a triangle will have three gaps. However, as shown in the figures, by using lobes, there are preferably only two gaps between the pin and the hole in the present invention. As shown in the details in FIGS. 5A and 5B, the gaps for the lobes are created by two circles 5 degrees apart in two of the lobes in each handle half locking pin hole. 5 degrees is derived from 2 times the 2.5 degrees missing from the handle rotating 177.5 degrees rather than a full 180 degrees. Furthermore, polygonal holes will not smoothly accommodate free rotation of the cylindrical bodies of the locking pins. While each lobe is circular in cross section (see, for example, FIGS. 5A and 5B) for ease of manufacture, the lobes can be of any cross-sectional shape.

Because the locking ability of the present invention depends on the contact area between the holes and the pins, it is preferable to maximize that contact area. Because there are only two small gaps, unlike polygonal pins which have approximately 50% contact between the hole and pin in the locked position, the present invention's nearly perfectly matched shapes produce a much greater contact area, even up to approximately 100% contact, in the locked position. Furthermore, polygonal designs have sharp corners where the sides of the two stacked shapes cross, which become the only geometry supporting the round sections of the pins in "balisong" mode. Trying to modify the geometry of these points to accommodate the round sections of the pins means further reducing the contact area in the locked position. As opposed to regular polygons, the asymmetric positions (for example, trapezoidal arrangement) of the four columns of lobes was discovered to leave only two very small gaps when the hole can accommodate the pin at both angles. The use of four columns of lobes provides excellent surface contact in both the locked and free rotation positions. Gaps still exist, but the extra lobes help keep the pin positioned correctly and more evenly distribute the torque. Other numbers of lobes may be used; however, fewer lobes would result in larger gaps, which reduces the contact area and increases the force at certain points when the device is in the locked position, and more lobes would reduce the circular area in contact with the body of the locking pin, thus making free rotation less smooth.

While the pins and holes could be made to have 720 sides, they would lock the device any position in half degree increments. This would solve the positional locking problem, but the hole shape in the handles also needs to have round sections (the non-lobed, circular portion of the handle half locking pin holes) which match the round sections of the pin to allow free rotation. It is also impractical to make pins and holes at this scale with large numbers of sides.

Note that in the specification and claims, "about" or "approximately" means within twenty percent (20%) of the numerical amount cited. As used herein, the singular forms "a," "an," and "the" include plural referents unless the context clearly dictates otherwise. Thus, for example, reference to "a functional group" refers to one or more functional groups, and reference to "the method" includes reference to equivalent steps and methods that would be understood and appreciated by those skilled in the art, and so forth.

Although the invention has been described in detail with particular reference to the disclosed embodiments, other embodiments can achieve the same results. Variations and modifications of the present invention will be obvious to those skilled in the art and it is intended to cover all such modifications and equivalents. The entire disclosures of all patents and publications cited above are hereby incorporated by reference.

What is claimed is:

1. A balitool comprising:

two handles;

at least one tool; and two pins for connecting the handles to the at least one tool;

wherein a circumference of each pin comprises:

four first semicylindrical protuberances trapezoidally arranged around the circumference, each said semicylindrical protuberance starting at a first base of the pin and extending parallel to an axis of the pin toward a second base of the pin; and four second semicylindrical protuberances, each second semicylindrical protuberance colinear with one of the first semicylindrical protuberances.

2. The balitool of claim 1 wherein bases of the first semicylindrical protuberances which are not coincident with the first base of each pin, and bases of the second semicylindrical protuberances, are chamfered.

3. The balitool of claim 1 wherein the handles are tapered.

4. The balitool of claim 1 wherein each handle comprises two halves which sandwich the at least one tool.

5. The balitool of claim 4 wherein a first handle half comprises a top half of a first handle and a bottom half of a second handle, and a second handle half comprises a bottom half of the first handle and a top half of the second handle.

6. The balitool of claim 5 wherein the first handle half and the second handle half each comprise an opening for receiving a pin;

wherein the opening comprises four lobe receptacles corresponding to the four first and second semicylindrical protuberances on each pin;

wherein two adjacent lobe receptacles are sized to snugly accommodate a semicylindrical protuberance disposed therein; and wherein the other two adjacent lobe receptacles are larger than the two adjacent lobe receptacles to accommodate approximately 5° of arcuate movement of a semicylindrical protuberance disposed therein.

7. The balitool of claim 6 wherein the opening in the first handle half is a mirror image of the opening in the second handle half.

8. The balitool of claim 1 comprising baliscissors and wherein the at least one tool comprises two scissor blades.

9. The balitool of claim 8 wherein each pin comprises threaded bosses extending from the first base and the second base.

10. The balitool of claim 9 comprising a button assembly, the button assembly comprising a first button half connecting the first base of a first pin and the first base of a second pin and a second button half connecting the second base of the first pin and the second base of the second pin, wherein the first button half and the second button half are approximately parallel and the first pin and the second pin are approximately parallel to each other and approximately perpendicular to the first button half and the second button half.

11. The balitool of claim 10 wherein each button half comprises two oval openings for accommodating the corresponding threaded boss on the first pin and the corresponding threaded boss on the second pin.

12. The balitool of claim 8 wherein each scissor blade comprises a base portion, the base portion comprising a recess for receiving a magnet, an opening for receiving one of the two pins, and a slot for receiving the other of the two pins.

13. The balitool of claim 12 wherein an end of each slot is configured to lock a pin in place.

14. The balitool of claim 8 wherein the first semicylindrical protuberances on a first pin are shorter than the first semicylindrical protuberances on a second pin and the second semicylindrical protuberances on the first pin are longer than the second semicylindrical protuberances on the second pin.

* * * * *